(12) United States Patent
Peterson

(10) Patent No.: US 8,325,463 B2
(45) Date of Patent: Dec. 4, 2012

(54) DYNAMIC CAPACITOR ENERGY SYSTEM

(76) Inventor: William Mehrkam Peterson, Chandler, AZ (US)

( * ) Notice: Subject to any disclaimer, the term of this patent is extended or adjusted under 35 U.S.C. 154(b) by 960 days.

(21) Appl. No.: 12/290,789

(22) Filed: Nov. 4, 2008

(65) Prior Publication Data
US 2010/0109473 A1 May 6, 2010

(51) Int. Cl.
*H01G 9/00* (2006.01)
(52) U.S. Cl. ........ 361/502; 323/285; 323/290; 323/305; 363/82; 363/90; 363/152; 320/166
(58) Field of Classification Search .................. 361/502; 136/248, 253, 205, 206, 293; 323/285, 290, 323/305; 320/166
See application file for complete search history.

(56) References Cited

U.S. PATENT DOCUMENTS
2010/0043867 A1* 2/2010 Peng .............................. 136/248
* cited by examiner

*Primary Examiner* — Nguyen T Ha
*Assistant Examiner* — Hung Dang

(57) ABSTRACT

One embodiment of an improved energy conversion and storage system uses pre-charge-enabled energy-converting variable capacitors that can be substantially encapsulated in asphalt roads or streets. Another embodiment can be substantially encapsulated in concrete walls or rooftops. Radiant solar energy does work on temperature-sensitive capacitors. Temperature change, in one embodiment, modifies the capacitance of the previously pre-charged capacitor, thereby converting solar energy into increased electrical energy available for practical use, without needing parabolic reflectors and without needing any moving parts. Other embodiments are described and shown.

13 Claims, 23 Drawing Sheets

➡ 24 MegaWatt Hours per mile of asphalt road

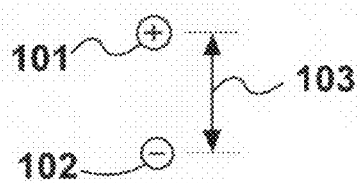
FIG. 4a.
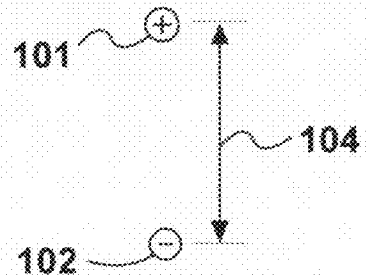
FIG. 4b.
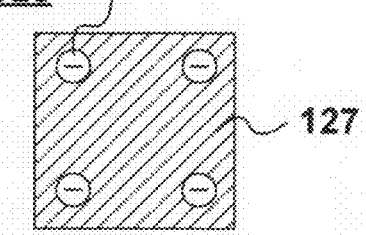
FIG. 5a.
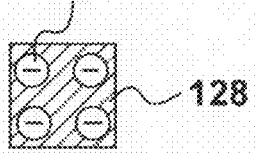
FIG. 5b.
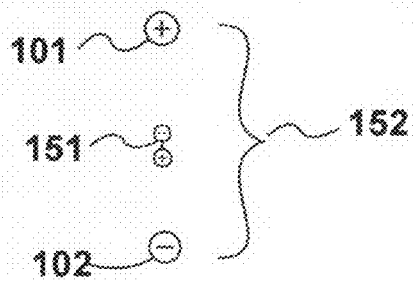
FIG. 6a.
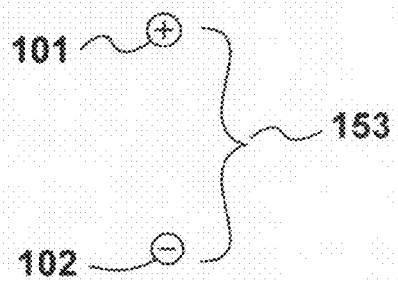
FIG. 6b.
175
FIG. 7a. Planar
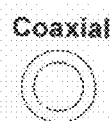
FIG. 7b. Coaxial
FIG. 7c. Rolled
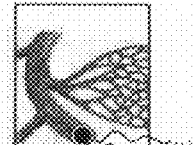
FIG. 7d. Vein-Like Topology
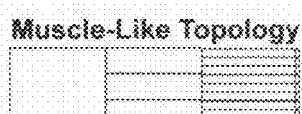
FIG. 7e. Muscle-Like Topology
etc.

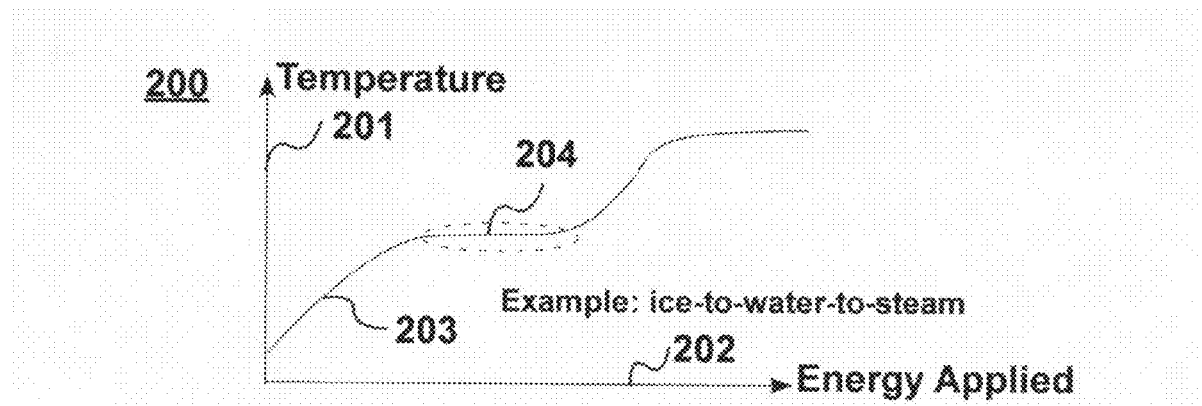
FIG. 8a. Phase Change Example
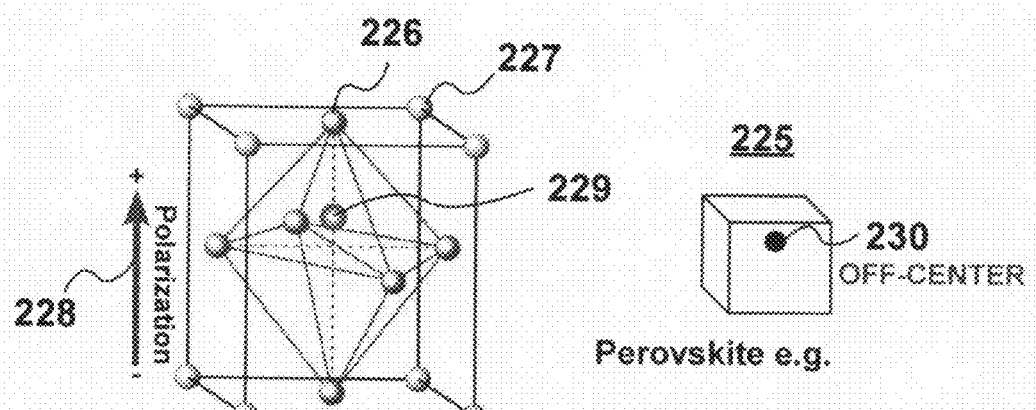
FIG. 8b. COLD phase
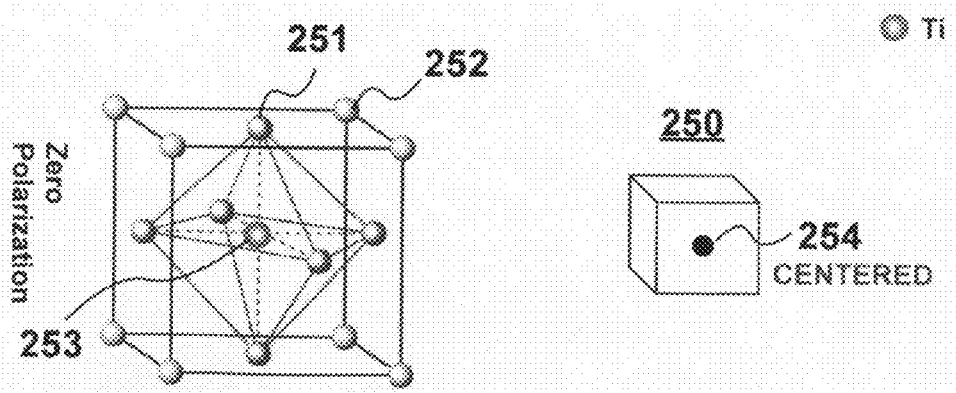
FIG. 8c. HOT phase

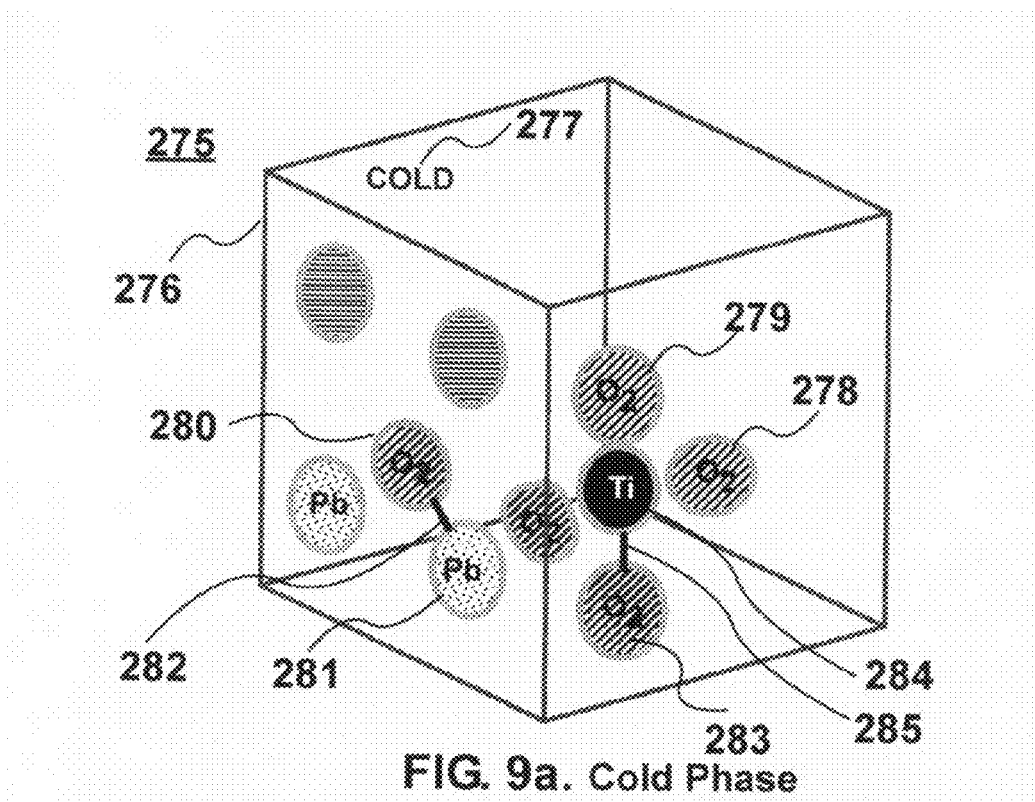
FIG. 9a. Cold Phase
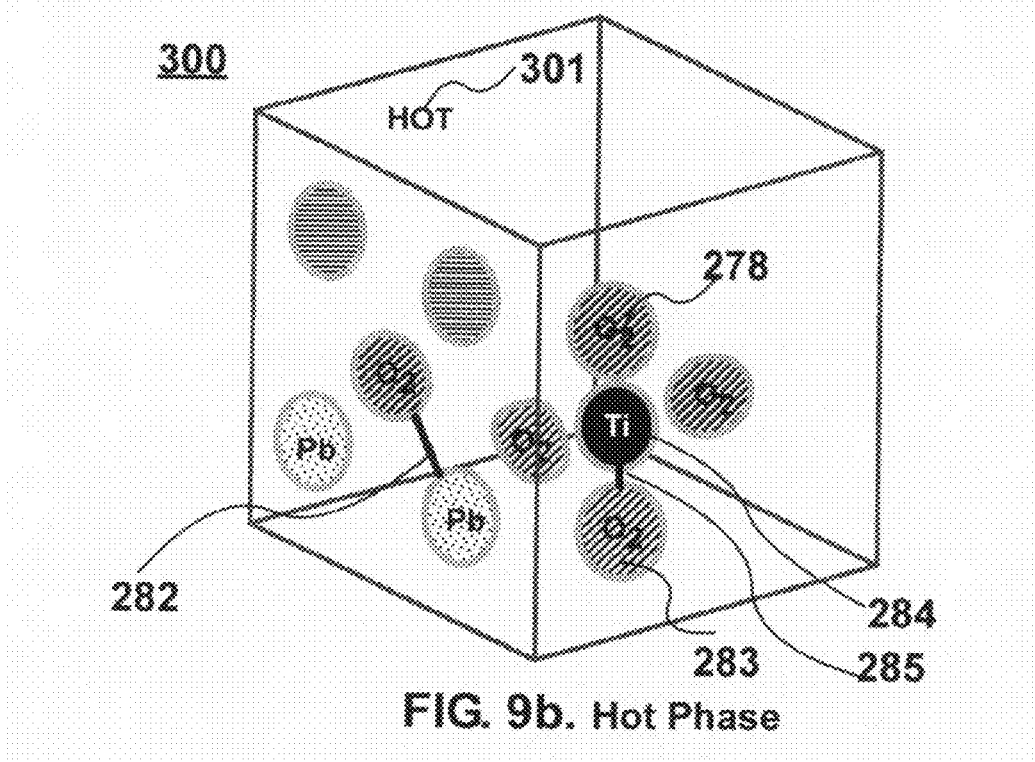
FIG. 9b. Hot Phase

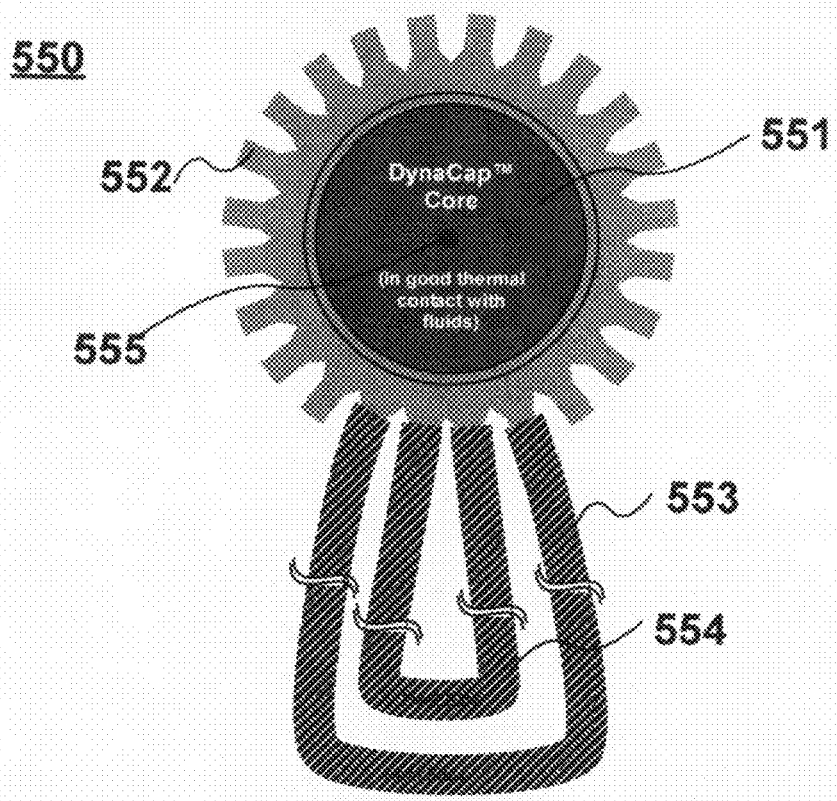
FIG. 19 Heat tubes
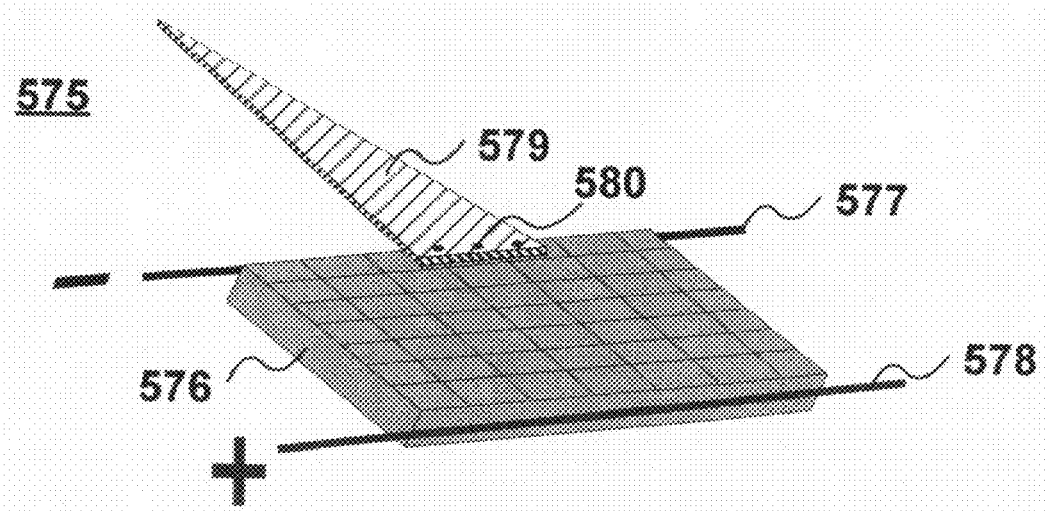
FIG. 20 Heat Fins

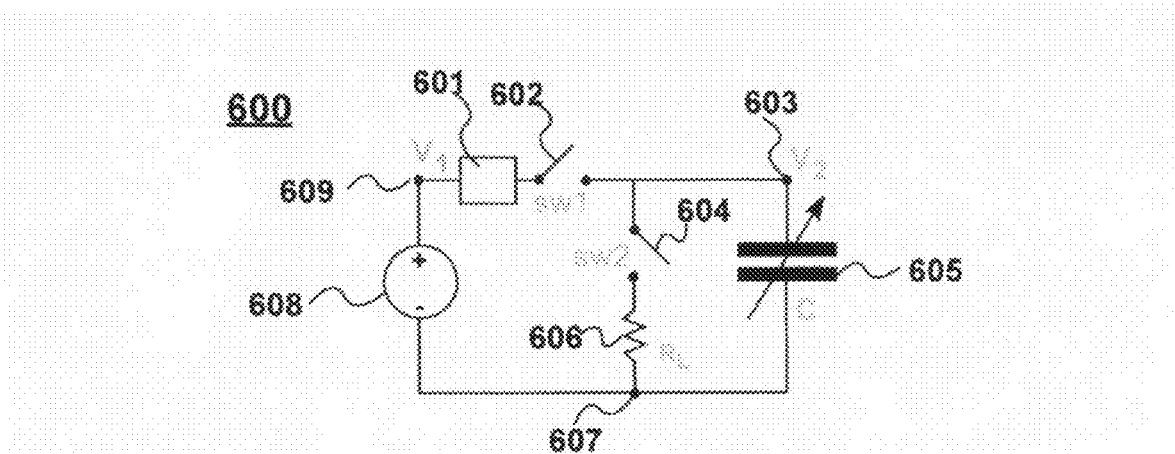
FIG. 21
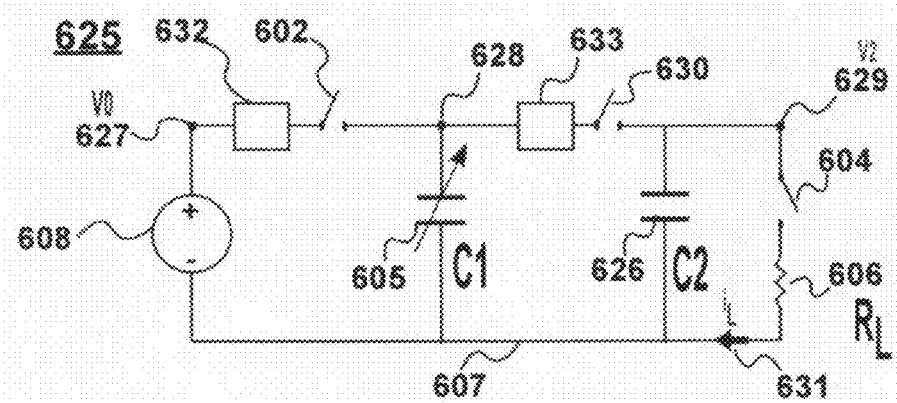
FIG. 22
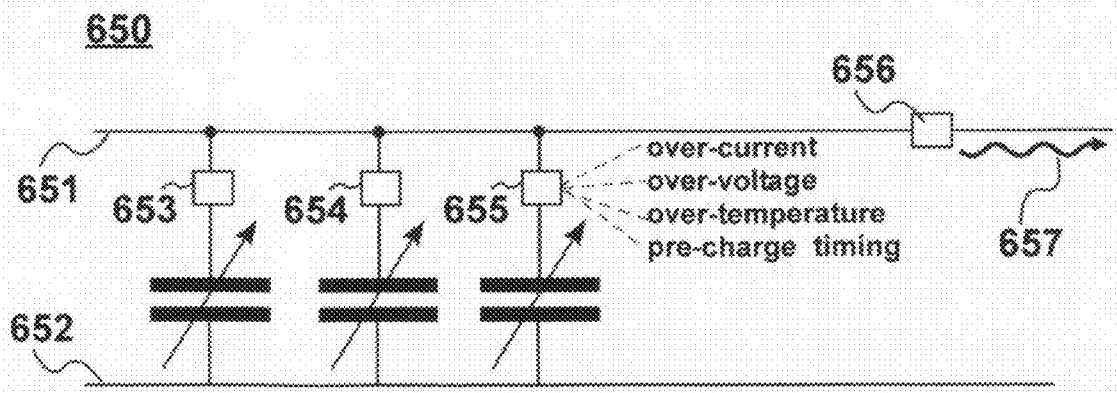
FIG. 23 Peripheral Electronics

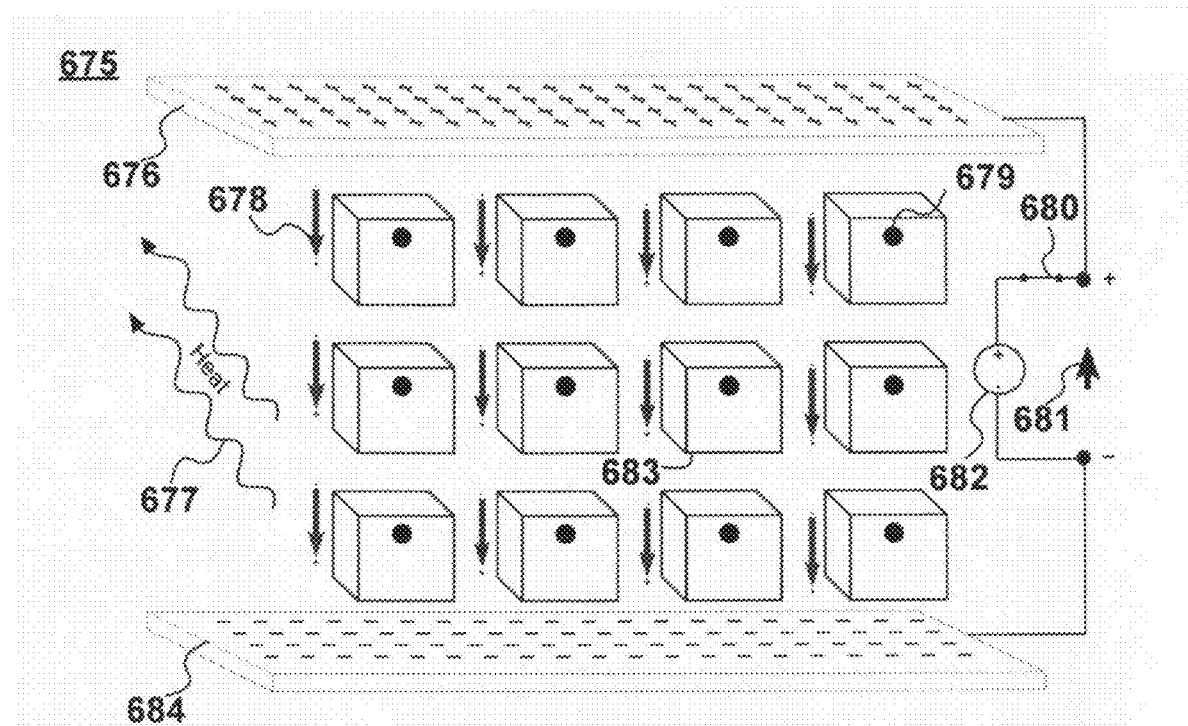
FIG. 24a (Cold)
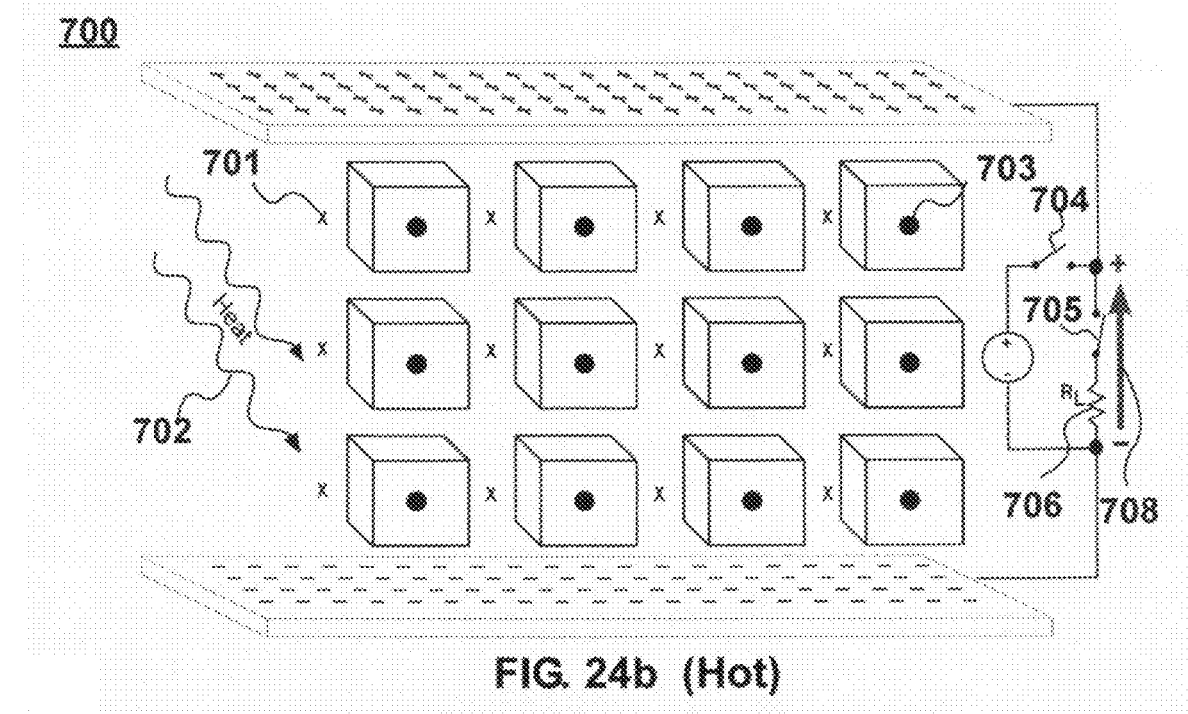
FIG. 24b (Hot)

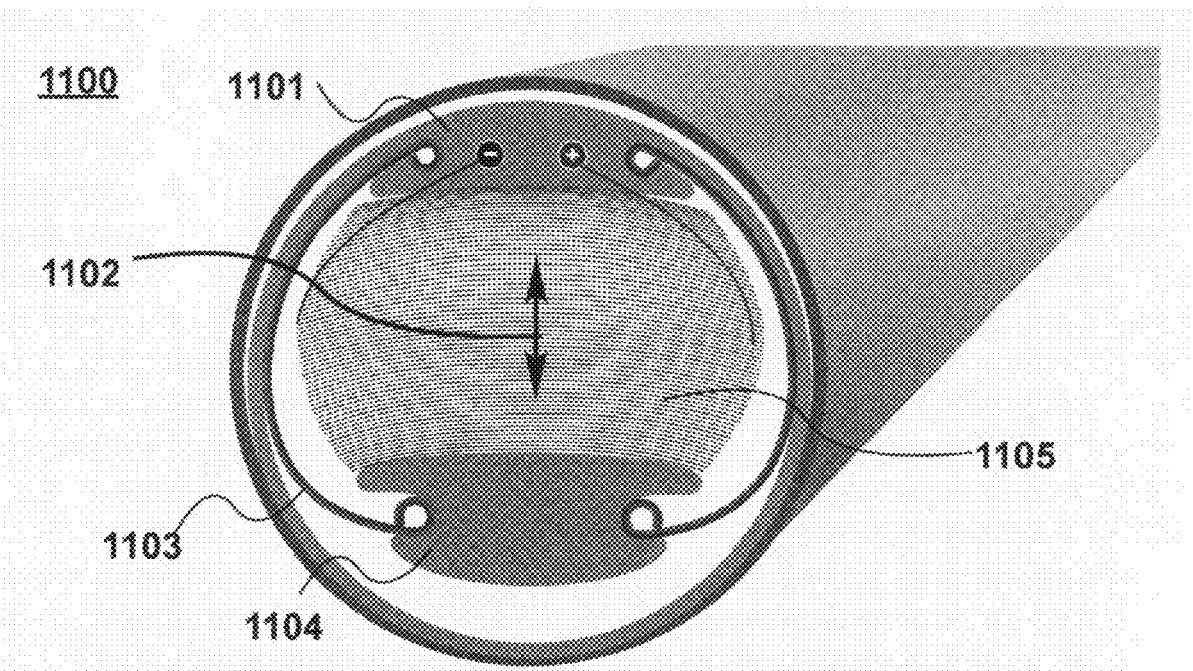
FIG. 37 Bi-Metalic Bender Adjustments
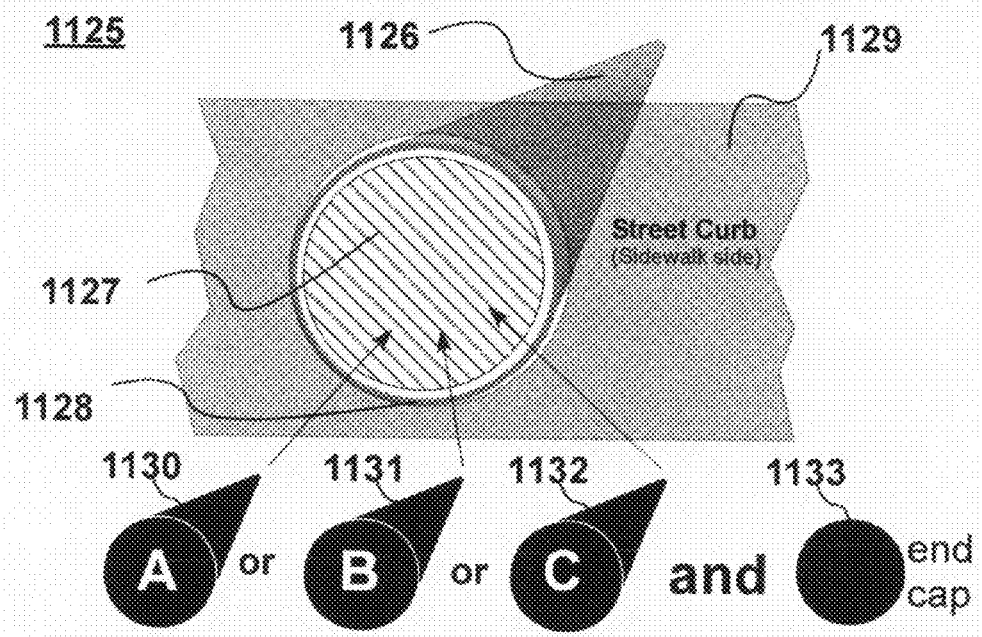
FIG. 38 Interchangeable, Replaceable Interior Elements

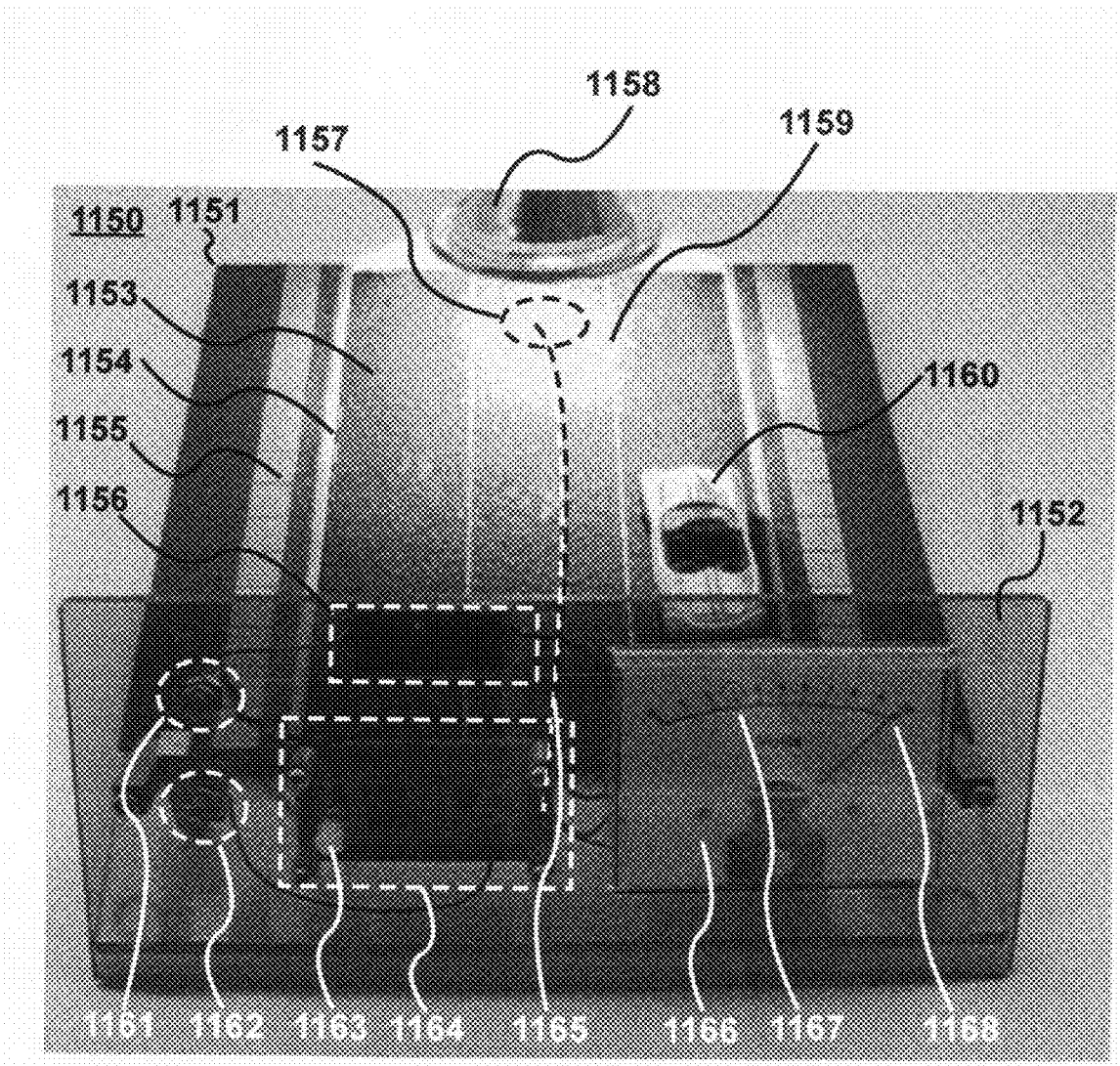
FIG. 39 Small-scale demonstration of a *pre-charge enabled energy converting variable capacitor* encapsulated in an *asphalt* road.

DYNAMIC CAPACITOR ENERGY SYSTEM

CROSS-REFERENCE TO RELATED APPLICATIONS (Not Applicable)

BACKGROUND OF THE INVENTION

People around the world are desperately seeking a breakthrough in sustainable, low-cost means for generating and storing electricity.

Clean, sustainable energy sources like solar, tidal, and geothermal sources, can power the energy system of the present invention. Electricity is the optimum form of energy-output, due to its high transmission efficiency and ubiquitous use in homes, businesses and future automobiles. It is especially appropriate when combined with new high-energy storage capacitors, which are being co-developed and co-refined with the present invention.

Truly global impacts from successful implementations of this invention can include the following: Virtual elimination of "oil addiction," reversal of global warming and revitalization of global economies.

The prior state of the technology includes ordinary means for photovoltaic and solar-thermal energy conversion. However, all practical prior solutions have several major limitations. For example, practical photovoltaic devices do not store energy (in themselves), are generally costly, must be customized for each installation, require delicate transparent enclosures and bulky mounting structures (usually on rooftops).

The real estate needed for utility-scale energy farms can be a significant cost penalty, whereas the present invention does not require new land. Instead the present invention can make dual-use of existing asphalt-covered areas (e.g. roads, streets, parking lots).

The present invention significantly improves-upon and extends the practical utility of energy conversion technologies that employ variable capacitors. While the prior art, such as U.S. Pat. No. 6,936,994 B1 does describe how moving capacitor plates can convert mechanical energy to electricity, it does not show how to make a practical in-asphalt energy conversion and storage system, as is shown in the present invention.

Therefore, the present invention fulfills an urgent need with new and unique solutions.

BRIEF DESCRIPTION OF THE DRAWINGS

FIG. 4a. Low-energy state of separated charged particles in space.

FIG. 4b. High-energy state of separated charged particles in space.

FIG. 5a. Low-energy state of separated charged particles on an electrically conductive material.

FIG. 5b. High-energy state of more crowded charged particles on an electrically conductive material. Note the higher forces trying to repel the like-charged particles.

FIG. 6a. Intervening charged dipoles, as in dielectric materials, oppose the electric field between the other charged particles. The net electric field is reduced due to the dielectric material.

FIG. 6b. When dipoles, as shown in FIG. 6a, are effectively removed or reduced in strength, then the electric potential (voltage) between the other charges increases.

FIG. 7. This set of figures illustrates several physical shapes (topologies) that can act as variable capacitors.

FIG. 7a shows a planar electrode topology.

FIG. 7b. Coaxial cylindrical electrode topology.

FIG. 7c. Rolled pair of sheet-like electrodes topology.

FIG. 7d. Vein/artery-like coaxial cylindrical electrode topology.

FIG. 7e. Muscle-like topology of coaxial cylindrical electrodes topology.

FIG. 8a. In order to illustrate a phase change principle, this graph shows phase changes that water experiences when changing states (i.e. ice to water). Note the region in which temperature does not increase despite a steadily increasing amount of applied energy. During such phase changes, energy is being stored elsewhere (internally, in increased degrees of molecular freedom of motion).

FIG. 8b. Many materials, such as perovskite ceramic materials, can undergo phase changes. One phase, often at low temperatures, leaves an off-center charged particle. This yields a net polarization field.

FIG. 8c. When materials like that shown in FIG. 8b are heated, they can undergo a phase change resulting in a configuration as shown in FIG. 8c. Thus, often at higher temperatures, a more-centered charged particle yields a reduced net polarization field. This polarization can act like the dipole shown in FIG. 6a.

FIG. 9a. When materials such as perovskite ceramic materials change phase, there are complex interactions at the atomic scale. This figure shows that various atoms in the molecular cell have temperature-dependent preferred locations. The specific material illustrated here is merely representative of many different perovskite-like materials that may be used as capacitor dielectrics.

FIG. 9b. The same material as in FIG. 9a, except at a higher temperature. Note the changed relative locations of the central ion (Ti), as well as other atoms. Note that the net polarization is reduced.

Figure 11:
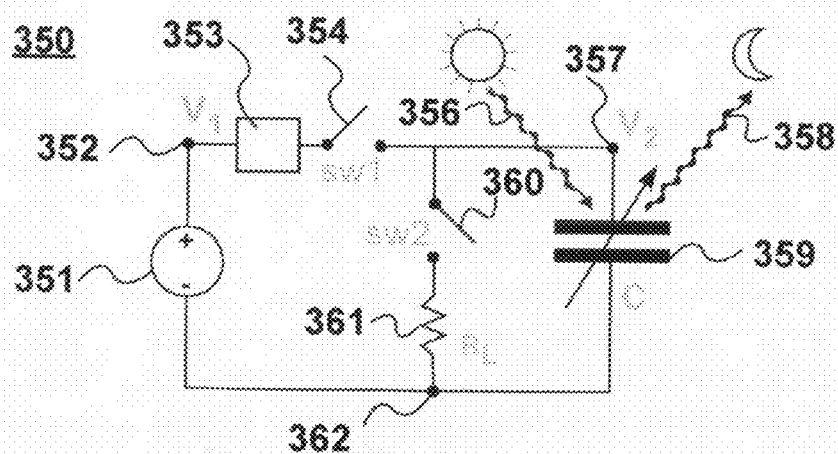

FIG. 11. This electrical circuit diagram shows some components in the dynamic capacitor energy system. A representative dynamic capacitor is shown as a conventional variable capacitor symbol. Heating and cooling of the capacitor are depicted, too.

Figure 12:
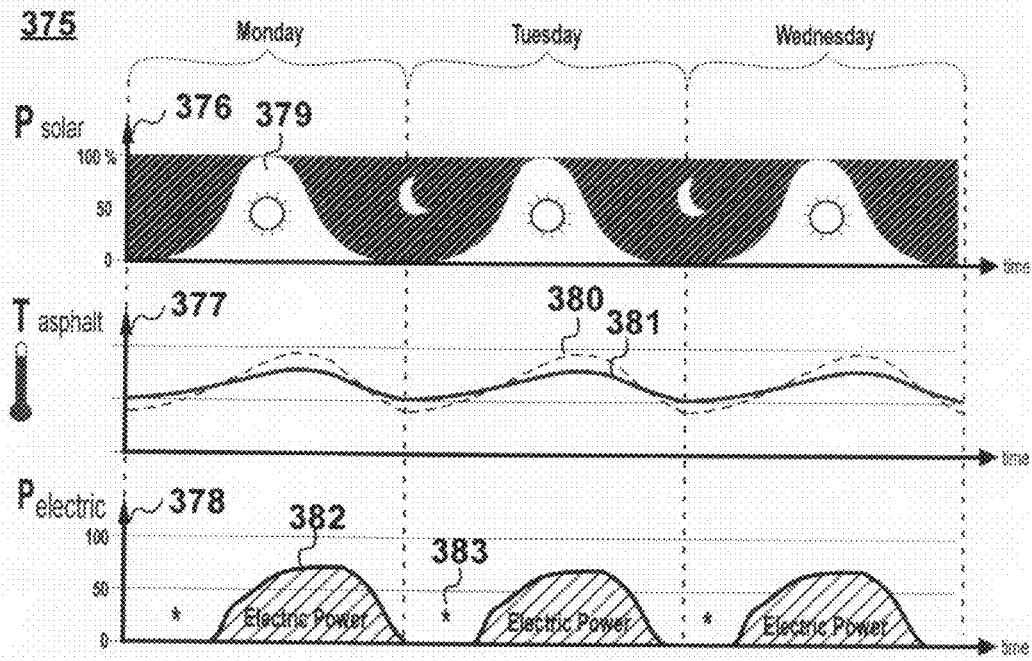

FIG. 12. This three-part timing diagram roughly illustrates three 24-hour cycles of one kind of dynamic capacitor energy system. Daytime and nighttime drive temperature and power cycles. The precise curve shapes and relative timing are only roughly approximate, since they depend strongly on the specifics of implementation. Note: The gaps in electric power are easily filled by a plurality of out-of-phase subsystems.

Figures 13A, 13B:
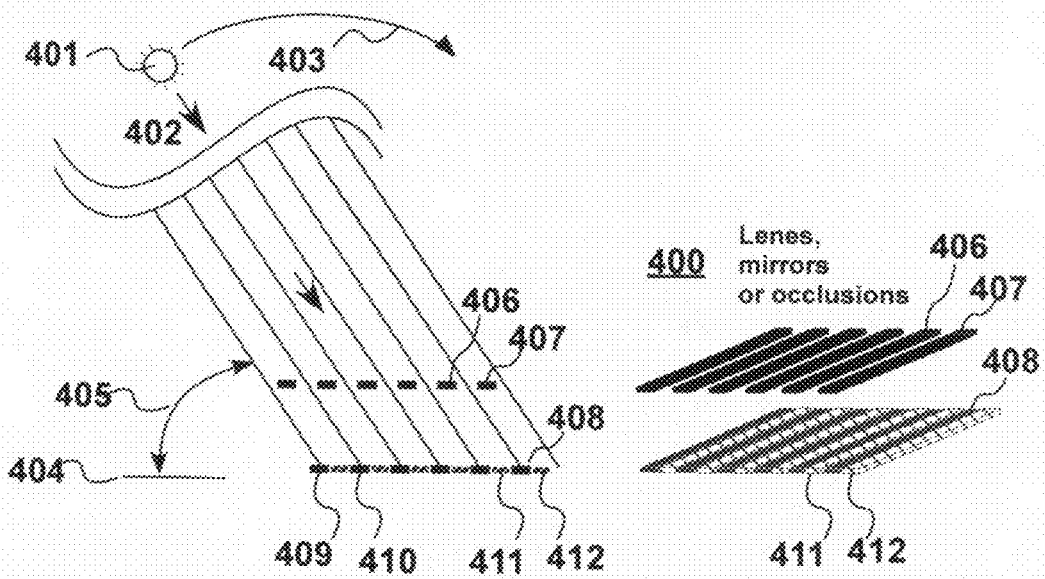

FIG. 13a. Energy cycles can have a period of significantly less than 24 hours, by various means, such as that shown here. Substantially parallel rays of sunlight enter at an angle that changes over a 24-hour period. A set of occlusions, lenses or mirrors can concentrate the rays into a spatial pattern that alternately hits a plurality of dynamic capacitors. For example, a given set of capacitors becomes alternately hot, then cold, then hot, then cold, etc. Alternatively, trees, buildings, fences, etc can be used as the occlusions.

FIG. 13b. This figure shows a perspective drawing of arrays of linear elements that correspond to the end-on view FIG. 13a.

Figure 14:
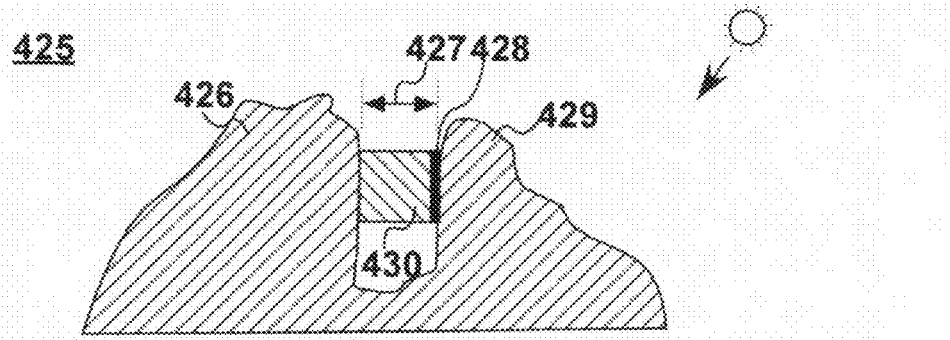

FIG. 14. Various massive structures on Earth can be used to concentrate energy for conversion and storage with dynamic capacitors. Usually, the energy source is the sun and the energy-cycle period is 24 hours. For example, a dynamic capacitor energy system can be installed in a fault, crevice or gap between two massive rock and soil structures. Here, the thermally induced relative movement of the sides of the gap can exert directed forces on dynamic capacitors and thereby generate enormous quantities of electrical energy.
This figure assumes primarily compressive forces.

Figure 15:
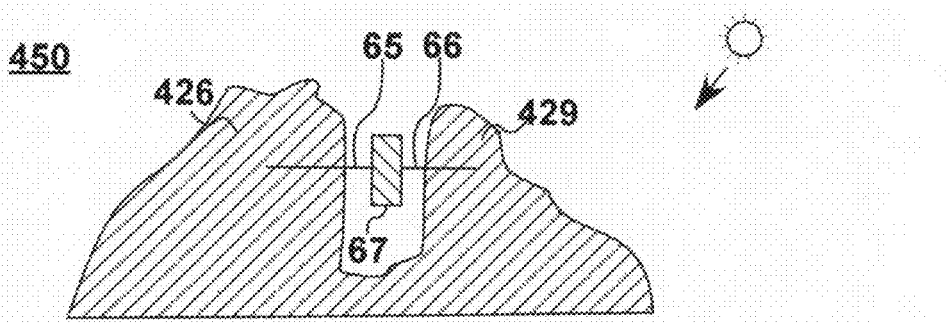

FIG. 15. This approach is like the approach described for FIG. 14, except that the primarily forces are conveyed as tension in strong cables. Note that the approaches can be combined, too.

FIG. 16. This figure illustrates top views of cable-connected energy concentrator subsystems. Here, the 24-hour solar heat cycles expand, then contract, then expand, then contract dark colored cables. The dynamic capacitors can be installed at the ends of cables, wherein variations in cable tension can drive the movable parts of said dynamic capacitors. Note that massive earth structures can be what expands and contracts, while the cables mostly convey the tension changes.

Figures 16A, 16B, 16C:
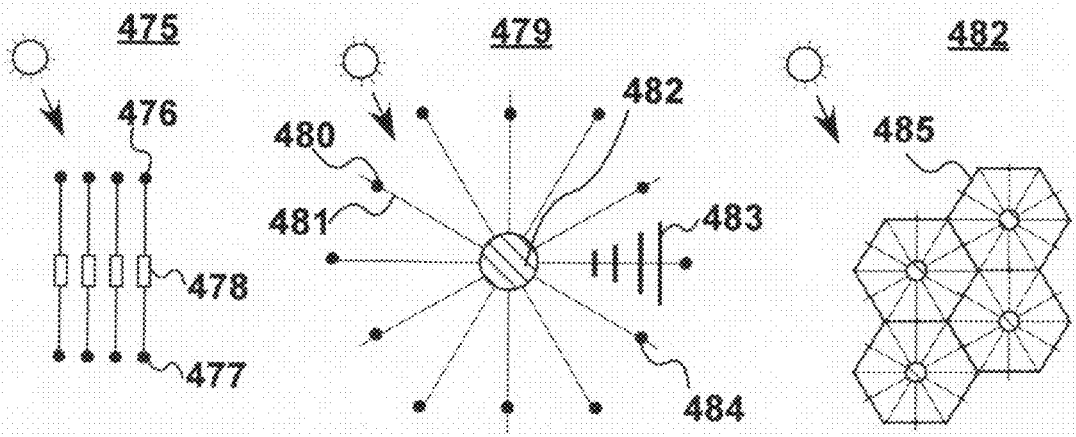

FIG. 16a shows a linear array topology of cables.

FIG. 16b shows a radial topology.

FIG. 16c shows a hexagonal array of such radial topologies, wherein, common stakes in the earth can be shared by nearby cells (to lower cost).

Figures 17A, 17B, 17C:
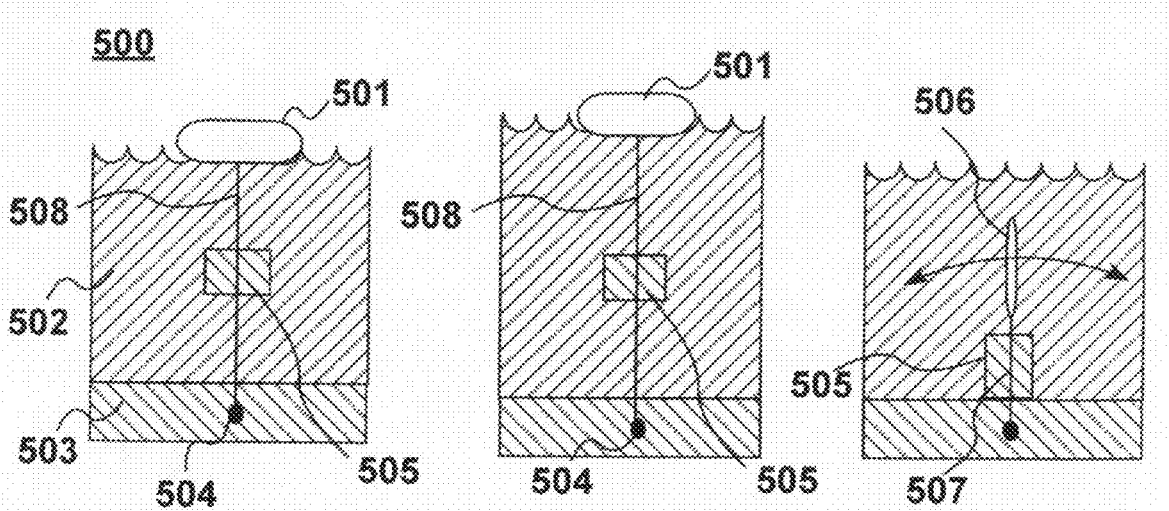

FIG. 17. This figure represents water-based implementations of dynamic capacitor energy systems. Here, water levels or currents drive dynamic capacitor moving parts. For example, in FIG. 17a, can represent a low-tide water level and FIG. 17b a high-tide water level. FIG. 17c collects alternating forces due to changing water currents. Note that the energy source can be from Earth-moon relative motion.

Figure 18:
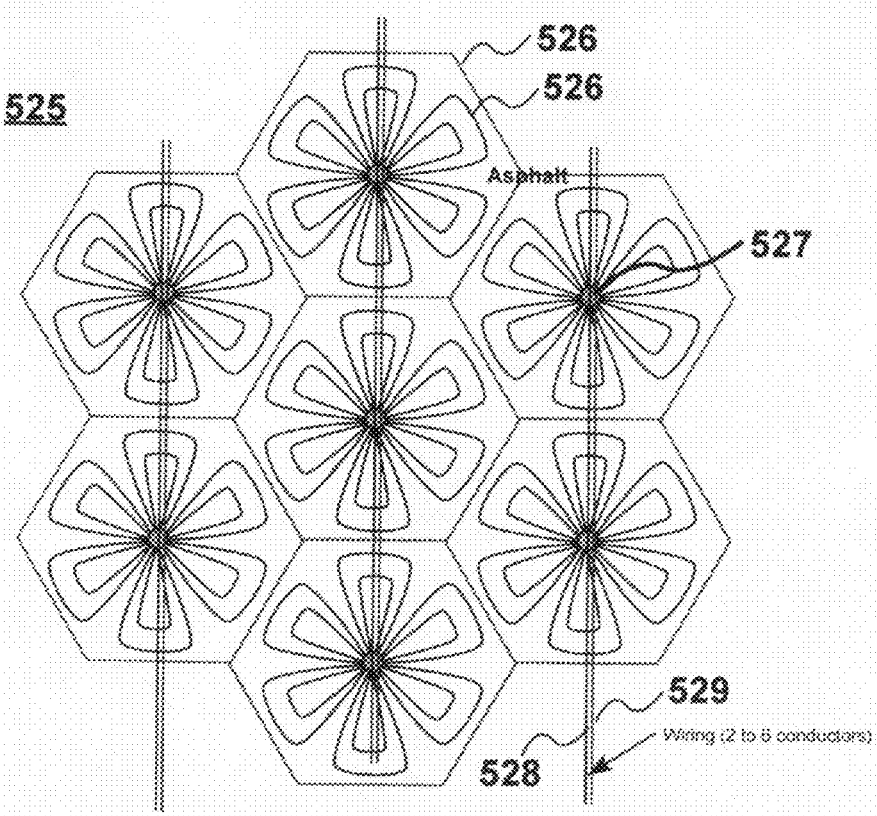

FIG. 18. This figure is a top view of one example of a layout of heat cells, dynamic capacitors' inter-core wiring and heat conveying elements. This example is hexagonal. Rectangular layouts are practical, too. The wiring can be arranged many different ways (e.g. almost any combination of series and parallel circuits).

FIG. 19. This figure is a top view showing a dynamic capacitor core enclosure with tubular heat conveying elements and manifold for fluid distribution. For example said tubes can be fluid-filled and form partially evacuated heat pipes or other simpler liquid heat-carrying subsystems. Also, this representative enclosure has a center pivot, about which a asphalt-coring bit can rotate to remove asphalt above the enclosure. This can facilitate repair or upgrade of a removable inner part of a dual nested enclosure from a more permanent outer enclosure.

FIG. 20. This figure is a perspective view of a low profile enclosure of a dynamic capacitor core. Low profile may be needed to avoid conflicts with city plumbing buried in asphalt roads. Strength is important if heavy automobiles travel on the asphalt, so this enclosure is internally ribbed with interlocking walls and a plurality of dynamic capacitors are arrayed inside. The triangle-like appendage is one representative heat conveying element (e.g. heat fin). A plurality of such fins can be fastened (welded, bolted, riveted, etc.) to the high thermally conductivity enclosure box. Part of the inter-core electrical wiring is shown. FIG. 32 shows more detail of the low profile enclosure box.

FIG. 21. This figure is similar to FIG. 11 and included here for convenient reference to FIG. 22.

FIG. 22. This circuit diagram includes a capacitor for intermediate energy storage.

FIG. 23. This circuit diagram illustrates various optional fault detection, fault isolation, and status monitoring electrical subsystems.

FIG. 24a. This perspective drawing depicts a relatively cold dynamic capacitor with a temperature sensitive dielectric, comprising a plurality of perovskite-like cells. Here, the ions are not centered and there is a large polarization field, that opposes the electric field from the charges on the top and bottom plates. When polarization is high, the capacitor is pre-charged from a electrical source.

FIG. 24b. This perspective drawing depicts the same dynamic capacitor shown in FIG. 24a, except at a hotter temperature, wherein the dielectric ions are much more centered, and therefore, the polarization is essentially zero. The voltage between the top and bottom plates is now higher than that of FIG. 24a, due to the added thermal energy that did work to rearrange the atoms in the ceramic cells. Since the capacitor now stores more electrical energy that used to pre-charge the capacitor, we can connect an electrical load to uses some of the newly added energy.

Figure 25A:
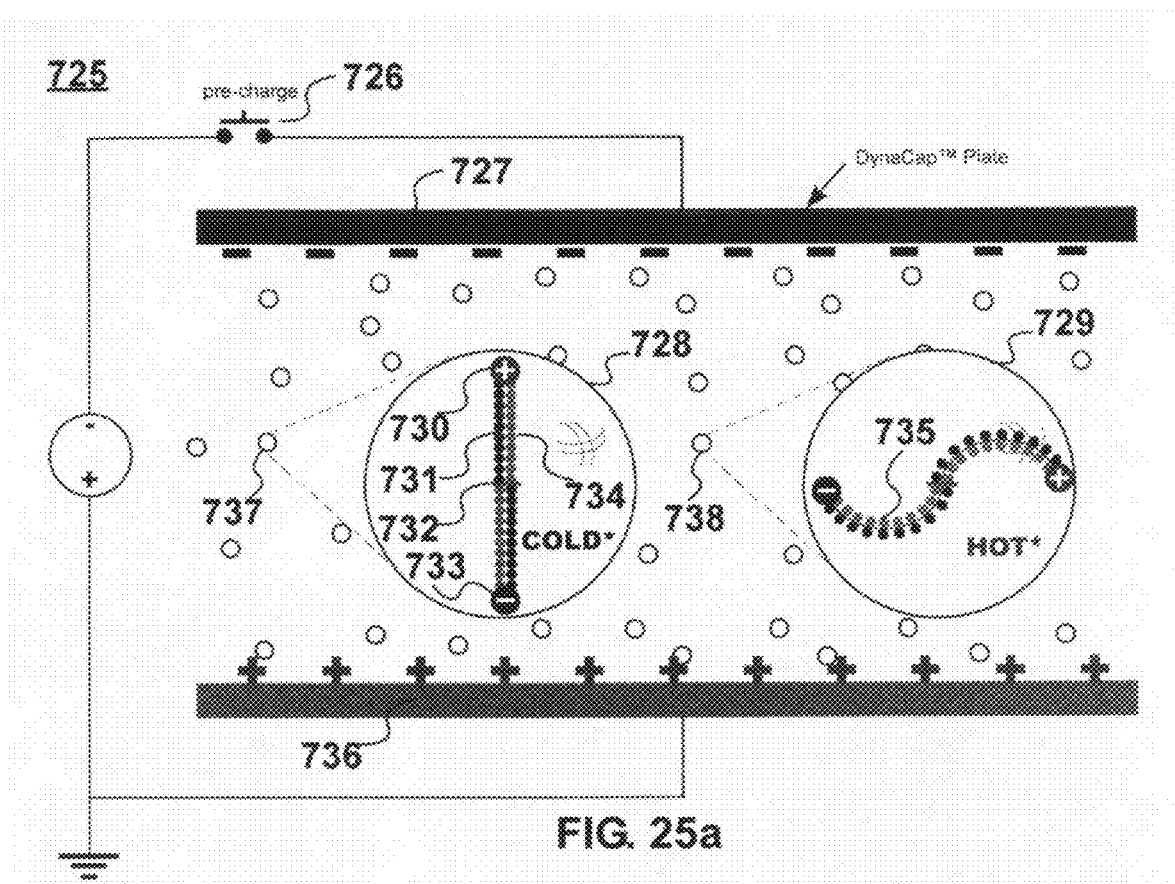

FIG. 25a. This highly magnified end view of a dynamic capacitor, shows conceptual polar molecules designed to move somewhat like the nearly-centered ions as found in perovskite ceramics. Two states are shown (although they would actually occur at different temperatures). One state of the molecule provides very high polarization that opposes the main electric field between the top and bottom plates. The other state is orthogonal to the main electric field between the top and bottom plates. Note the curves in the molecule.

Figure 25B:
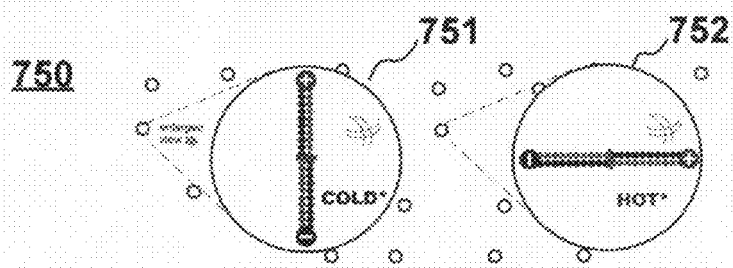

FIG. 25b. This highly magnified end view of a dynamic capacitor, shows conceptual polar molecules designed to move somewhat like that in FIG. 25a. Two states are shown (although they would actually occur at different temperatures). One state of the molecule provides very high polarization that opposes the main electric field between the top and bottom plates. The other state is orthogonal to the main electric field between the top and bottom plates. Note the lack of curves in the molecule.

Figure 25C:
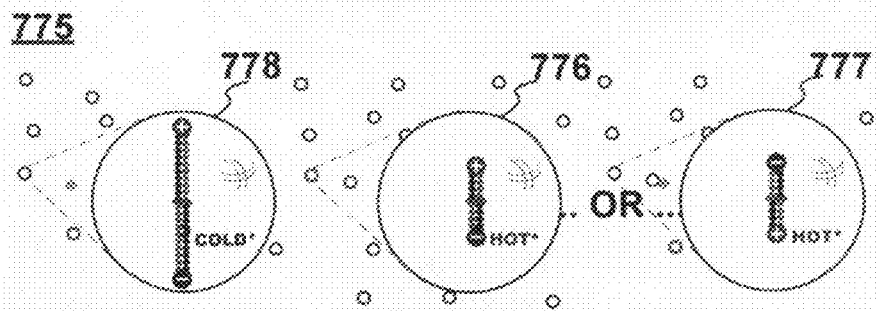

FIG. 25c. This highly magnified end view of a dynamic capacitor, shows conceptual polar molecules designed to move somewhat like that in FIG. 25b. The difference is that the molecule either shrinks/expands or rotates end-for-end.

Figure 26:
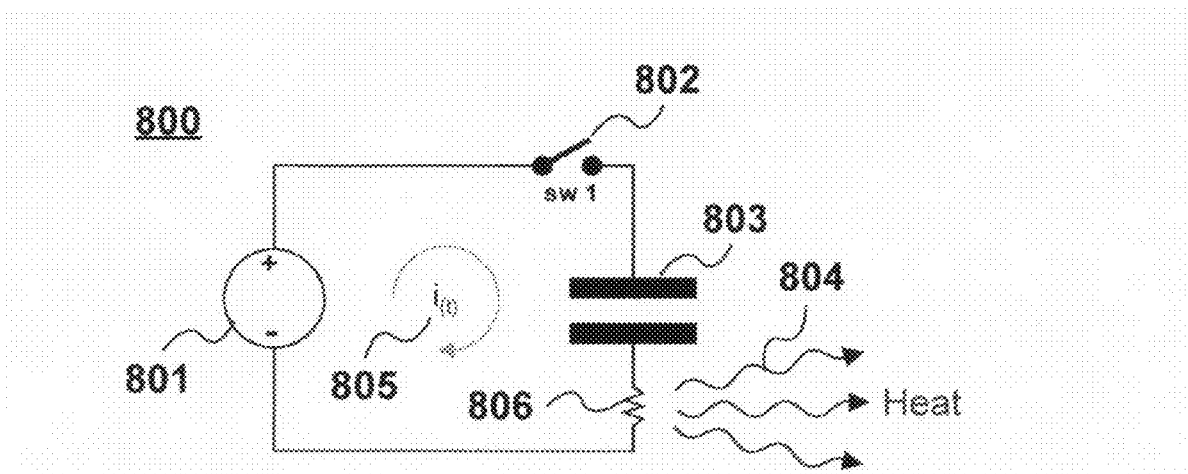

FIG. 26. This electrical circuit diagram emphasizes the energy loss in pre-charging using resistive current limiting, as opposed to using low-loss methods as in FIG. 27.

Figure 27:
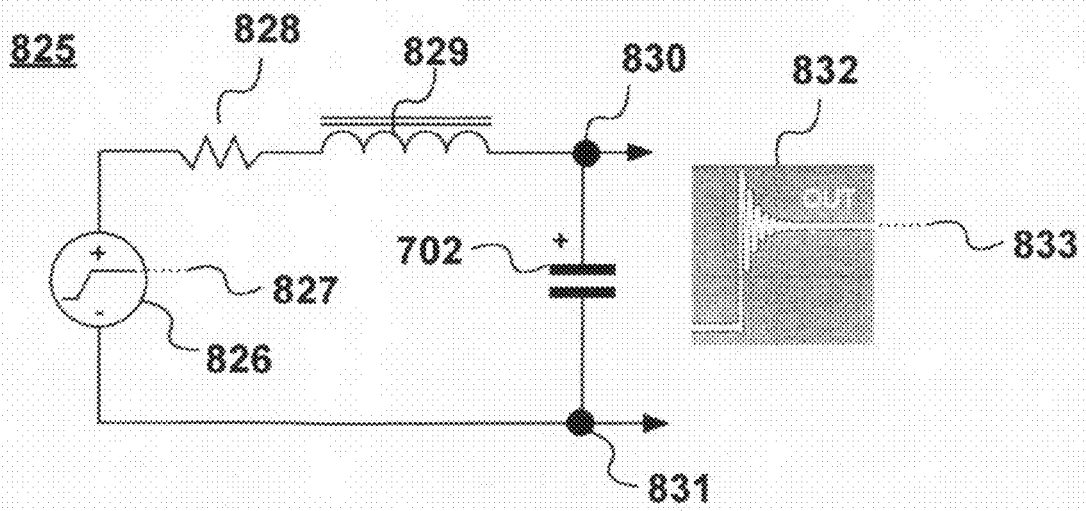

FIG. 27. This electrical circuit diagram shows a low-loss pre-charging (or charging) circuit employing an inductor. In this case, the resistance is dramatically reduced and the inductor captures and returns cycles of energy for use in charging the capacitor, rather that wasting it as heat.

Figure 28:
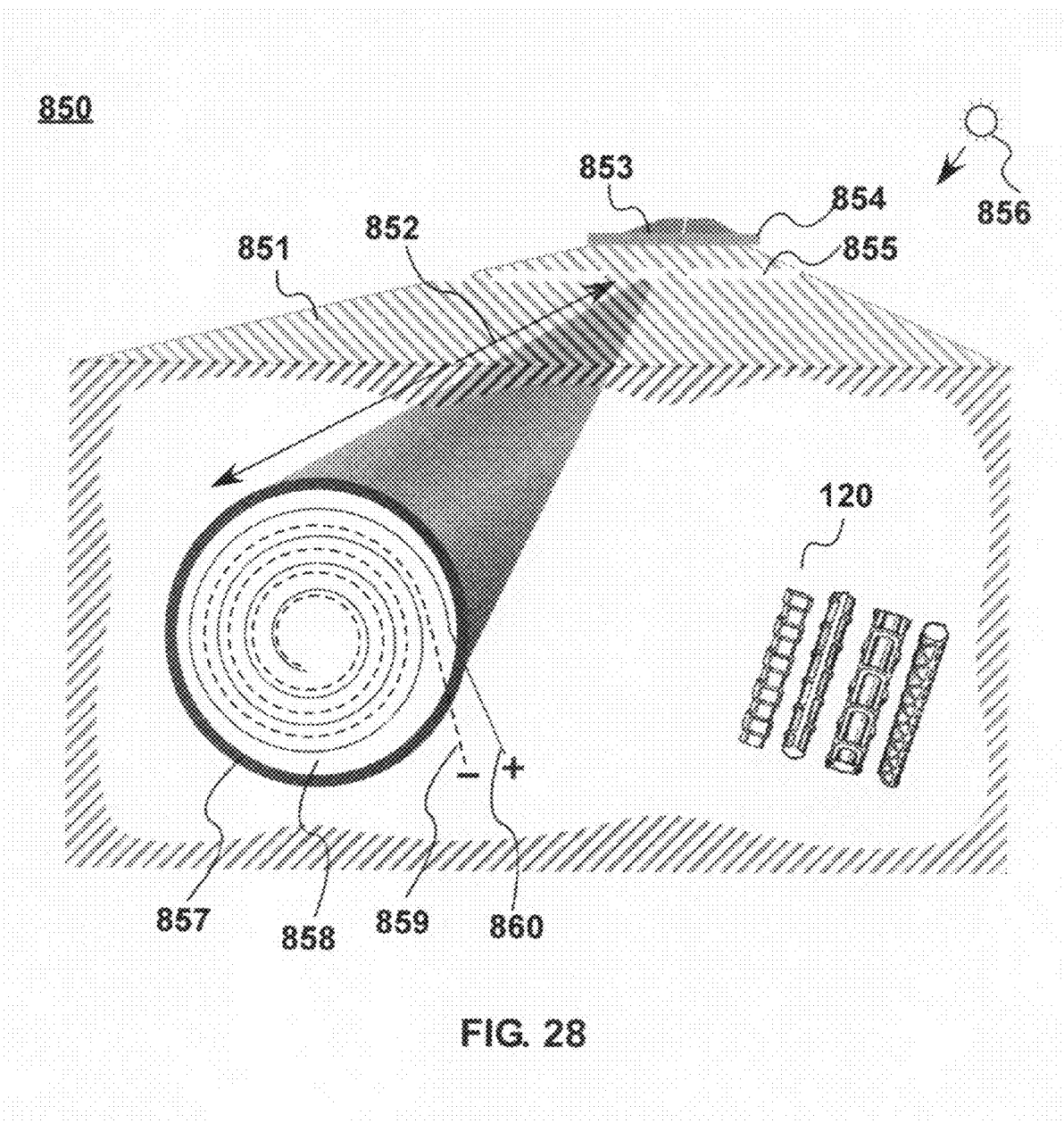

FIG. 28. This figure is similar to FIG. 1. Added are examples of rebar-like textures for use on the outside of dynamic capacitor enclosures, in order to grip the asphalt or concrete, thereby strengthening the asphalt or concrete and keep the cores from cold flowing out-of-place, over time.

Figure 29A:
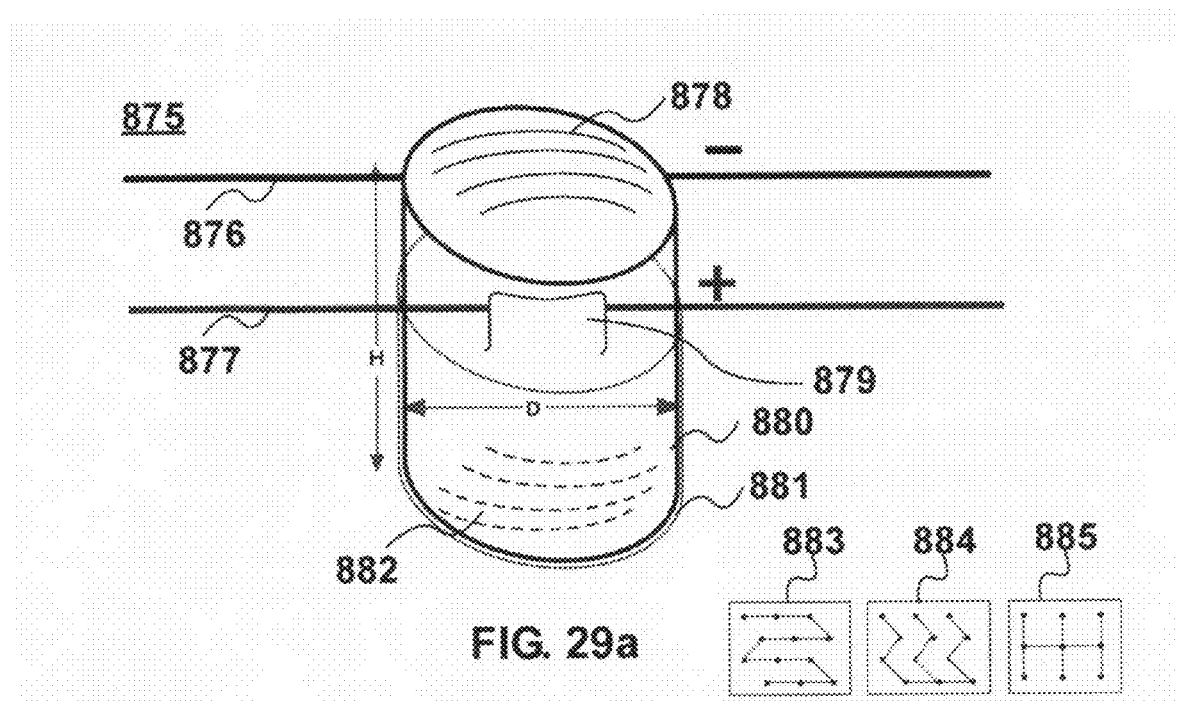

FIG. 29a. This figure is a perspective drawing of a deeper profile core enclosure. The domed top and bottom add strength. The lower portion is thermally insulated from the cooler asphalt under-layers. Some inter-core electrical wiring is electrically connected by (optional) insulation-displacement-connectors (IDCs). Also shown are, three examples of series/parallel electrical wiring of dynamic capacitor cores.

Figure 29B:
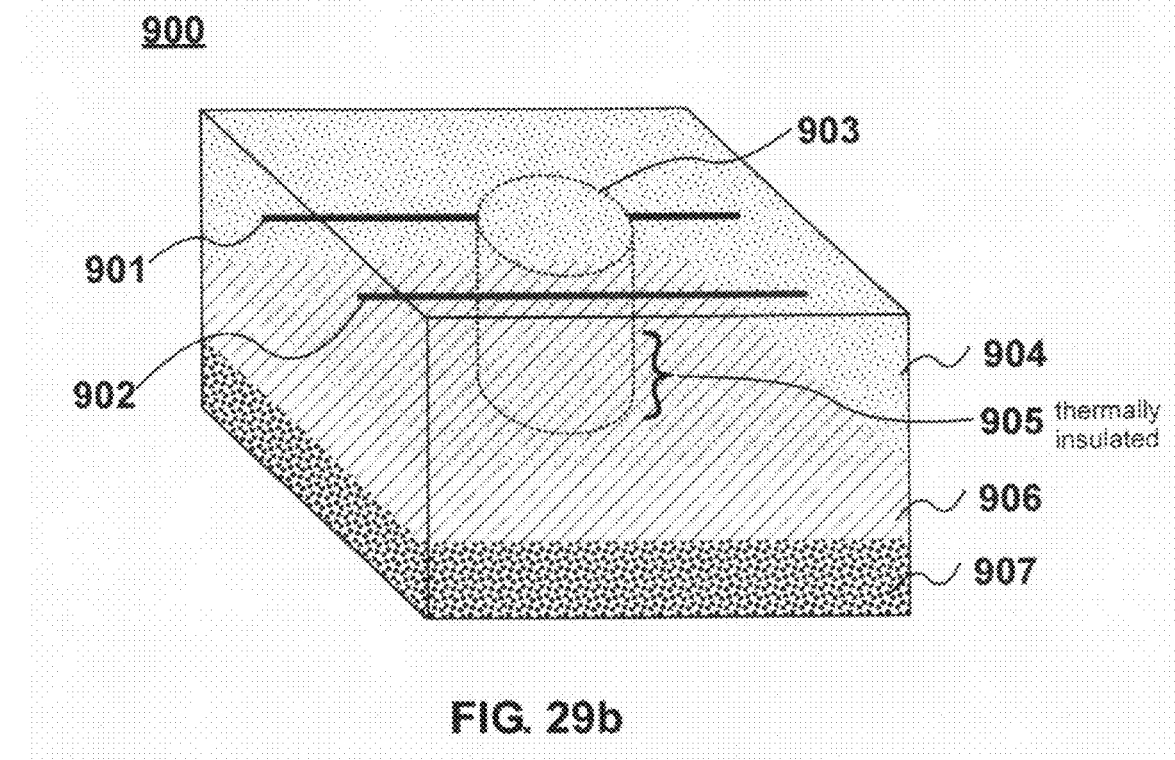

FIG. 29b. This figure shows how the enclosure in FIG. 29a can be buried in asphalt and its under-layers. The thermally insulated bottom section is indicated.

Figure 30:
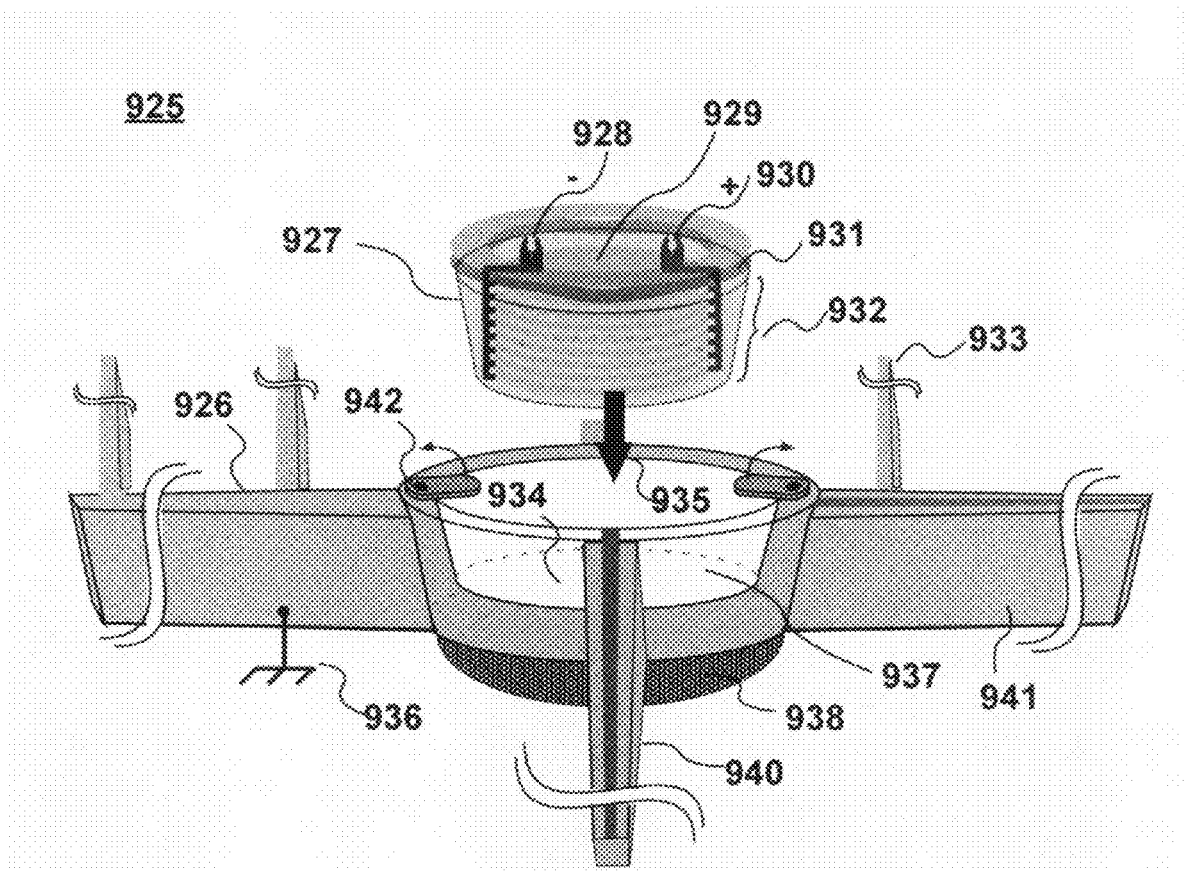

FIG. 30. This figure shows a partially exploded diagram of a dual nested core enclosure. The bottom part is more permanently embedded in asphalt. The removable upper part of the enclosure contains the dynamic capacitor and connections for inter-core electrical wiring. (Optional push-on IDC connectors are shown). Highly conducting (heat) fins help convey the heat from a large heat cell to the dynamic capacitor core. An explosion-limiting volume is shown at the bottom.

Figure 31:
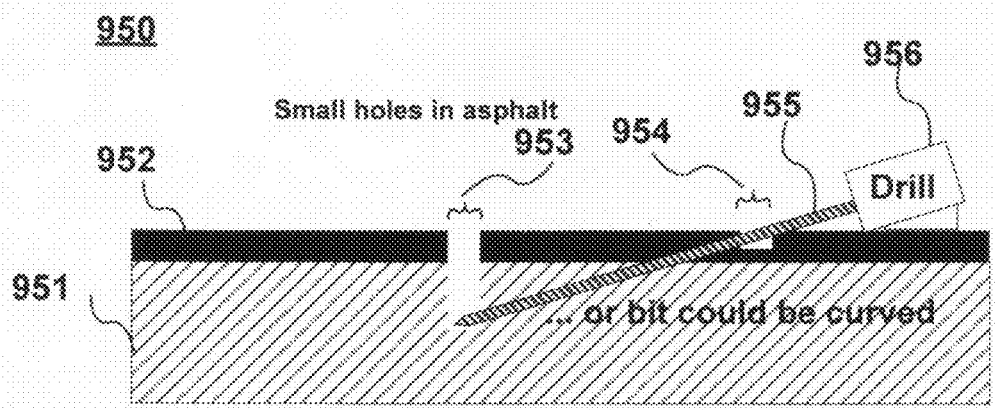

FIG. 31. This figure is a cross sectional view of an asphalt road, wherein a slanted drill bit is used to make a cylindrical hole for electrical wiring conduit. This allows minimal tear-up of asphalt roads. Small caps, somewhat like very small man hole covers, are used to cap the hole after a core is installed, repaired or upgraded. This can greatly reduce the cost and schedule of installing dynamic capacitor energy systems.

Figure 32A:
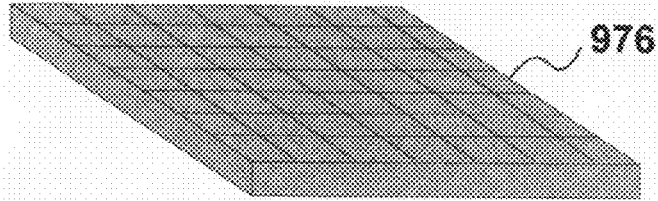

FIG. 32a. This figure shows a perspective view of a low-profile core enclosure, like that in FIG. 1 and FIG. 20. More detail is shown in FIG. 32b and FIG. 32c.

Figure 32B:
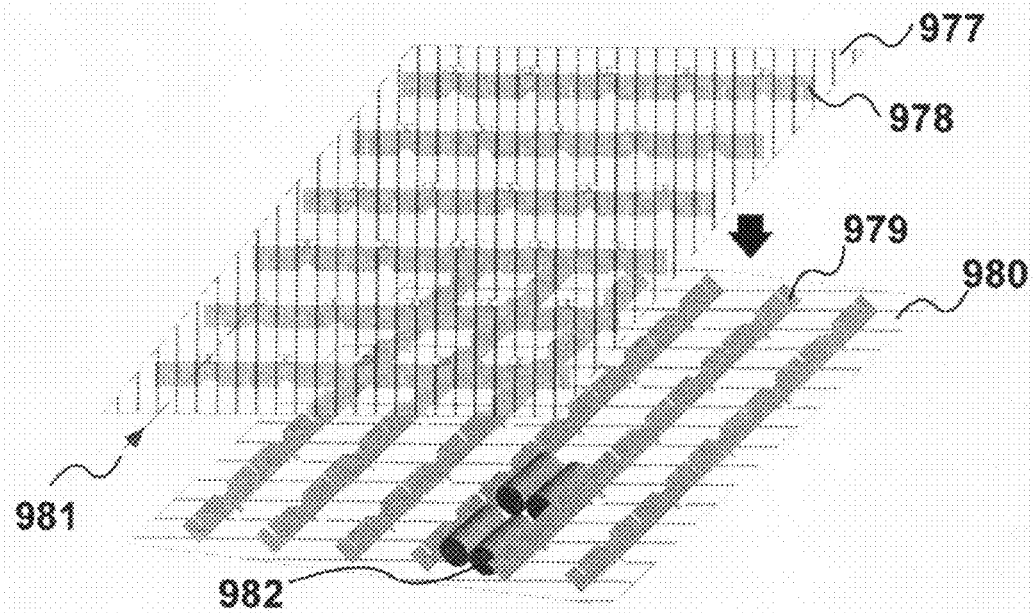

FIG. 32b. This figure shows a perspective exploded view of the top and bottom halves of the box shown in FIG. 32a. Also shown are four, of a plurality, of physically small dynamic capacitors efficiently packed into the open volumes of the box.

Figure 32C:
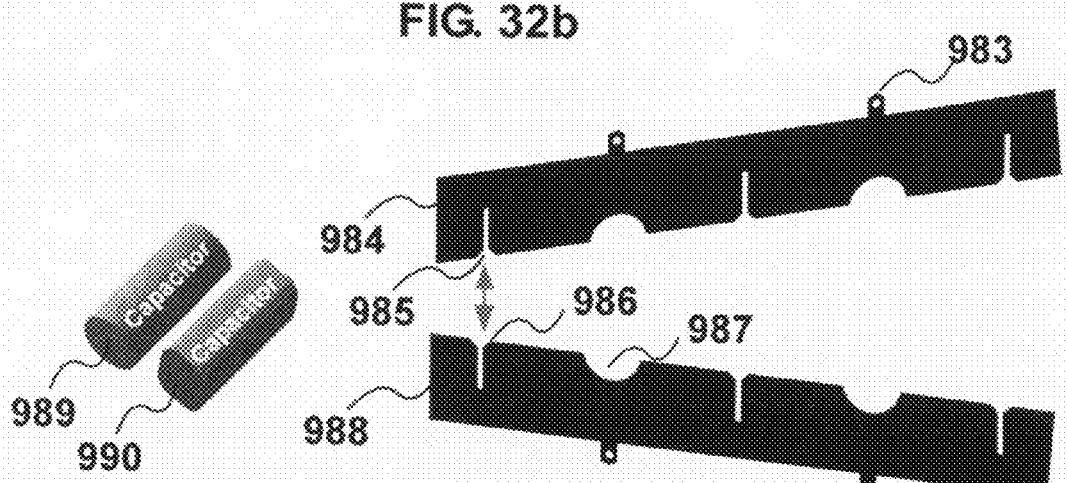

FIG. 32c. This figure clarifies one way of constructing the partitions or walls (that may need to support heavy automobiles). The slots interlock. The curved openings allow wire routing. The tabs with holes can be used to fasten the partitions or walls to the top and bottom plates. Two convenient shapes of dynamic capacitors are cylindrical and nearly rectangular solid, both of which can be made from rolled films.

Figure 33:
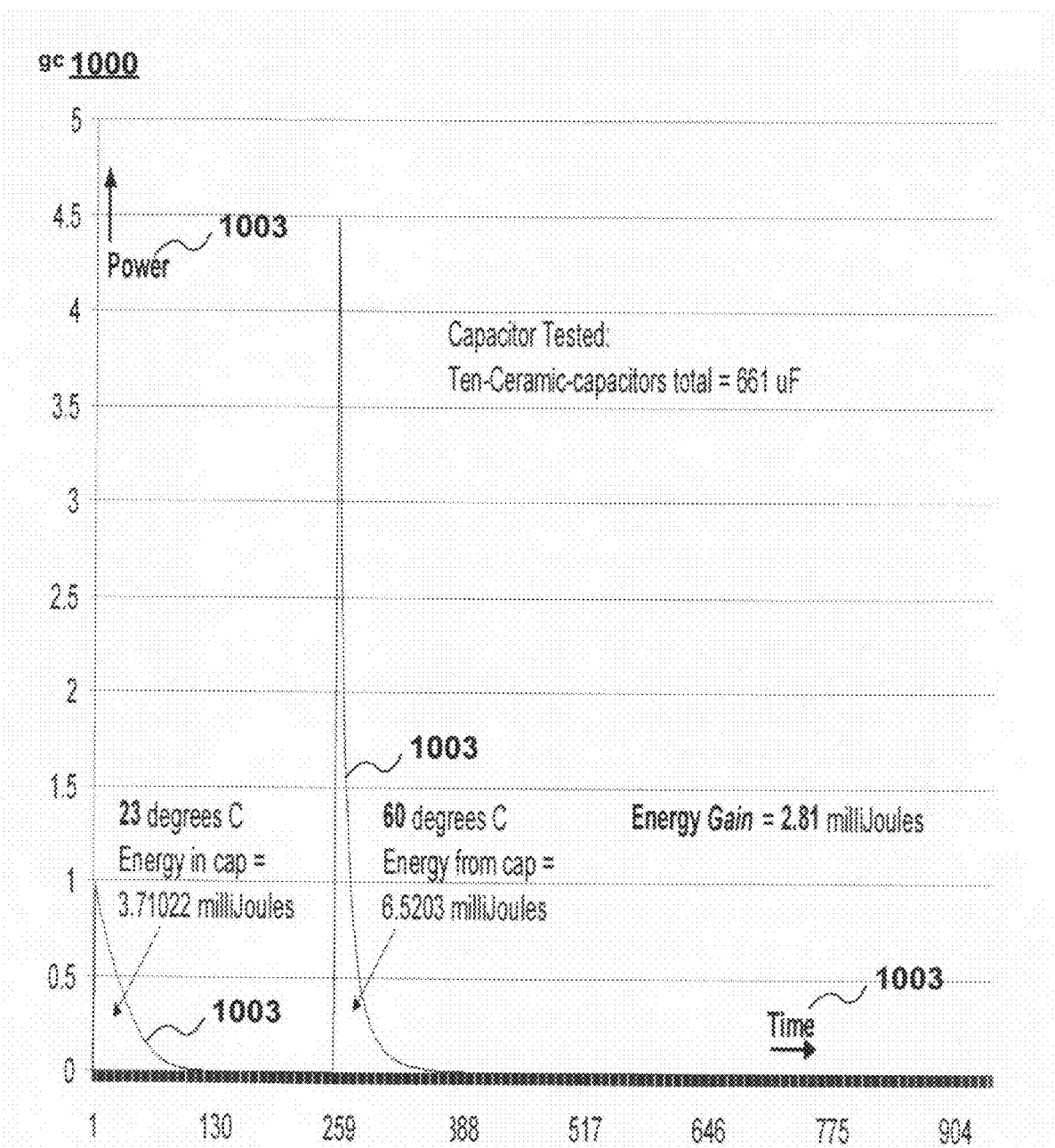

FIG. 33. This figure is like FIG. 2, except more detail is included. Again, this graph is from measured data FIG. 34. This figure is a log-log plot of the theoretical energy vs. road length. Three different dynamic capacitor technologies are plotted. In addition, convenient energy consumption references are included, such as typical daily US household usage, total US household usage and total world energy consumption.
If installed on a large scale, this dynamic capacitor energy system could supply a large part of the world's energy needs.

Figure 35:
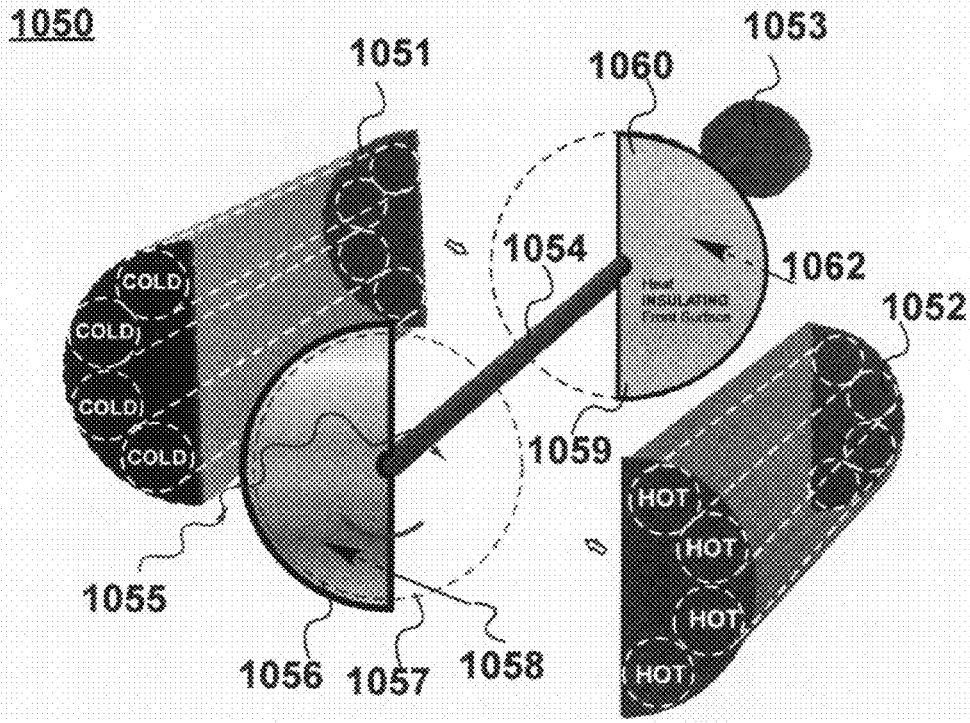

FIG. 35. This figure is an exploded perspective view of a rotary energy redirector for use with solar concentrators. About half the volume is occupied by "group A" dynamic capacitors. The other half by "group B" dynamic capacitors. Alternately, one group is made hot, while the other is made cool and visa versa. This is accomplished by a rotating, motor-driven energy deflector/insulator. The period of this energy cycle can be quite short (seconds or minutes).

Figure 36:
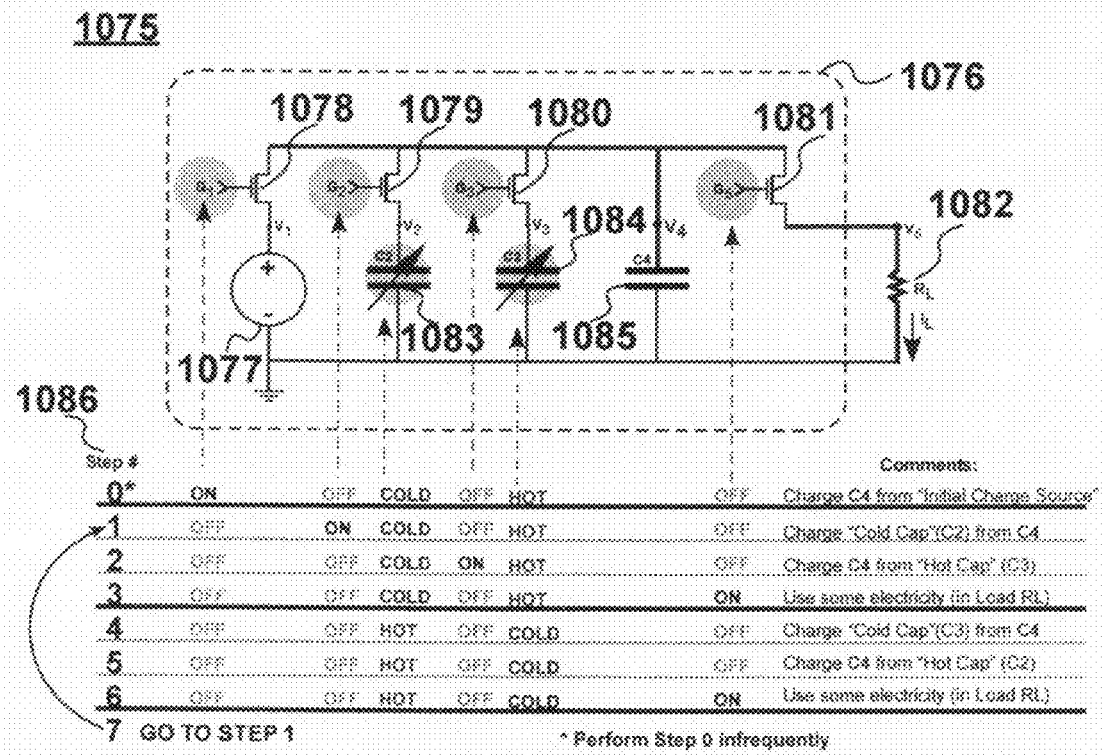

FIG. 36. This figure is a coordinated (aligned) schematic and information table used to describe the sequence of operations for the subsystem shown in FIG. 35.

FIG. 37. This figure shows a cylindrical dynamic capacitor core like those in FIG. 1, and FIG. 28, except a plurality of bi-metalic benders have been added to put a varied stress on the enclosed variable capacitor. There are two possible application: 1). To vary the capacitance with temperature. 2). To tune the thermal curves (especially curie temperatures) for more optimum energy yield in different seasons of geographical locations.

FIG. 38. This figure is a perspective view from a side of a road in which a long cylindrical dynamic capacitor core enclosure (a dual nested kind) is buried. In order to provide a replaceable core, at least one end of the tube can be opened (e.g. by a screw-off cap). The opening should project just beyond a concrete curb-like wall, preferably into an access box. Thus, various core enclosure (A, B, or C) can be slid into the more permanent hollow tube. This even allows for hybrid systems using fluid-based heat transfer and/or dynamic capacitor cores inside the hollow tubes.

FIG. 39. This photograph shows a small-scale demonstration of pre-charge enabled variable capacitors encapsulated in an asphalt road.

DETAILED DESCRIPTION OF THE INVENTION

In order to accurately and concisely describe the present invention, the following terms are first listed, then are defined below:

LIST OF DEFINED TERMS active relative motion configuration
active relative motion configuration
asphalt
capacitance-controlling curve
capacitance-controlling parameter
charged particle
conducted energy convection energy
conducted energy modulator
convection energy modulator
core enclosure
dc-to-ac inverter
dielectric constant
dual nested enclosure
dynamic capacitor core
dynamic capacitor energy system
dynamic capacitor installation
easy access enclosure
electrode
electrode shape
encapsulant
energy absorbing surface
energy conversion cycle
energy converting variable capacitor
energy emitting surface
energy redirector
energy yield fraction explosion-damage limiting enclosure
heat cell
heat conveying device
heat storing volume
hour cycle
hour-cycle device
inductance-based circuit for low-loss pre-charging
inter-core wiring
load bearing enclosure
multiple capacitance-controlling curve system
night-day cycle
non-core dynamic capacitor system node
non-variable capacitor
passive relative motion configuration
passive relative motion configuration
peripheral electronics
plate area
plate separation
pre-charge enabled energy converting variable capacitor
radiated energy modulator
radiated energy modulator
strengthening device
temporary energy store
under layer
variable capacitor
winter-summer cycle

DEFINITIONS OF TERMS

Note: Previously defined terms are italicized in the definitions below and other sections of this application.

"winter-summer cycle" is defined as a roughly 12 month cycle between coldest temperature and hottest temperatures or between the weakest and strongest energy levels.

"night-day cycle" is defined as a roughly 24 hour cycle between coldest temperature and hottest temperatures or between the weakest and strongest energy levels.

"hour cycle" is defined as a cycle between coldest temperature and hottest temperatures or between the weakest and strongest energy levels with period of less than 24 hours. For example, an array of stationary sunshades can alternately occlude received sunlight and result in periods of cool shade and hot sunlight. The time period between cool shade and hot sunlight can be any period less than 24 hours.

"energy conversion cycle" is defined as a winter-summer cycle, night-day cycle, or hour cycle.

"hour-cycle device" is defined as a mechanism with a rotating, revolving, or sliding element for the occlusion, reflection, absorption, refraction, diffraction or redirection of energy. This modulator can be of a two-channel design (one for cold path and one for hot path). For example, a rotating tilted mirror can direct concentrated sunlight in order to alternately heat, then cool a given region. See the main text for other examples.

"asphalt" is defined as asphalt concrete, asphalt, bitumen, or concrete.

"energy absorbing surface" is defined as one or more of asphalt, coal, tar, carbon-compound or mixture, dark pigment containing material, ash, dark rock, metal, water, paint, or nanotechnology-engineered surface.

"energy emitting surface" is defined as one or more of asphalt, coal, tar, carbon-compound or mixture, dark pigment containing material, ash, dark rock, metal, water, paint, or nanotechnology-engineered surface.

"heat storing volume" is defined as one or more of asphalt, coal, tar, carbon-compound or mixture, dark pigment containing material, ash, dark rock, metal, water, paint, or nanotechnology-engineered volume.

"encapsulant" is defined as one or more of asphalt, concrete, gravel, rock, soil, water, air, plastic, or composite (e.g. rock encapsulated in epoxy).

"under layer" is defined as one or more of gravel, rock, soil, water, or earth.

"heat conveying device" is defined as one or more of encapsulant, heat fins, high thermal conductivity material, aluminum, copper, high thermal convection device, high thermal radiation device, phase change device, water in container, refrigerant in container, low pressure vessel, or heat pipe.

"strengthening device" is defined as one or more of rebar-like outer texture (with "anchor" protrusions), fibers, carbon, fiberglass, or other rubber-like materials.

"energy redirector" is defined as one or more of, occlusion, reflection, absorption, refraction, diffraction, conduction, convection, or radiation.

"electrode shape" is defined as one or more of flat plates, curved surfaces, discs, rods, dendritic shapes, polymer shapes, etc. The electrode shape may include protrusions intended to increase surface area.

"electrode" is defined as one or more of an object containing a material capable of substantial conductivity formed in an "electrode shape" and made of copper, aluminum, steel, tin, zinc, carbon, graphite, or other good electrical conductor. One electrode is typically labeled "+". Another is typically labeled "−".

"charged particle" is defined as one or more electron, proton, hole, ion, dipole, charged molecule or object capable of increasing voltage between electrodes.

"plate area" is defined as area between the capacitor electrodes.

"plate separation" is defined as area between the capacitor electrodes.

"dielectric constant" is defined as relative permittivity of a dielectric.

"capacitance-controlling parameter" is defined as one or more of plate area, plate separation, dielectric constant, temperature, resonance, electronic band alignment, or pressure.

"variable capacitor" is defined as an object with at least two electrodes, capable of storing energy via electrically charged particles and capable of increasing voltage between its electrodes, due to a change in at least one capacitance-controlling parameter.

"energy yield fraction" is defined as the ratio of energy output to energy input.

"energy converting variable capacitor" is variable capacitor that is capable of increasing its voltage and its total stored energy due to work done on said variable capacitor by changes in any combination of said capacitance-controlling parameters. For example, high-temperature thermal energy (heat) can change one or more of the capacitance-controlling parameters, thereby doing work on the energy converting variable capacitor, which converts a fraction (the energy yield fraction) of said work into electrical energy.

"pre-charge enabled energy converting variable capacitor" is an energy converting variable capacitor that is electrically charged from an energy source in at least one phase of an energy conversion cycle.

"capacitance-controlling curve" is defined as the quantitative relationship between capacitance and various values of one or more capacitance-controlling parameters. When graphed, this relationship typically forms a curve. For example, the capacitance-controlling curve for a common Barium Titanate dielectric is usually a smooth curve with a peak near the Curie temperature.

"multiple capacitance-controlling curve system" is defined as an energy conversion system that incorporates more than one "capacitance-controlling curve" in order to maximize energy conversion efficiency despite challenging variations, such as the variations in extreme temperatures in summer vs. winter. Possible methods of curve selection include swapping one dielectric material for a different dielectric material as well as more sophisticated methods that alter a second capacitance-controlling parameter. For example, overall temperature controlled bimetalic benders can apply pressure on ceramics and change the temperature at which the capacitance peaks.

"temporary energy store" is defined as a device intended to hold energy that is received and held during times of amble energy availability, and to released when energy is needed.

"non-variable capacitor" is defined to be similar to the variable capacitor, except it may not need to change capacitance. The "non-variable capacitor" functions primarily as a temporary energy store. Energy efficient switches can transfer energy between the variable and non-variable capacitors.

"dynamic capacitor core" is defined as a pre-charge enabled energy converting variable capacitor thermally coupled to at least one heat conveying device.

"core enclosure" is defined as a structure that substantially contains a dynamic capacitor core and said structure has good thermal conductivity to a nearby heat conveying device. For example, a short hollow aluminum cylinder, a tall hollow aluminum cylinder, a long steel tube or a subdivided hollow aluminum box with low vertical height can each be a core enclosure. Low-profile (vertical height) enclosures may be needed in order to avoid buried pipes and wires often found under city asphalt roads. Alternatively, interstate highways, for example, rarely have buried pipes, so a higher vertical profile enclosure may be a better choice.

"load bearing enclosure" is defined as a core enclosure that is designed to support heavy loads such as cars and trucks, the when the enclosure is buried in asphalt. For example, a vertically positioned cylinder with a strong domed top and bottom, a horizontally positioned tube with a naturally strong vertical profile, or interlocking perpendicular partitions within a low-profile metal box can each be a load bearing enclosure. (The interlocking perpendicular partitions can be sized to efficiently contain individual capacitors, which are electrically wired together).

"dual nested enclosure" is defined as a two-part core enclosure with one part easily removable from the other. For example, the removable part can contain the pre-charge enabled energy converting variable capacitor and the non-removable part can be permanently embedded in asphalt. If both parts use tapered side walls, then good wall-surface-contact and thus good thermal conductivity can be assured.

"easy access enclosure" is defined as a core enclosure that is designed to be relatively easily accessed despite being buried in asphalt. For example, easy near-to-curb-access can be attained by use of long horizontal tubular core enclosures that protrude through the curb and into an easy-access box. Alternatively, core enclosures can be designed to withstand (and even aid) asphalt coring (cutting of an annular ring from above the core enclosure.) For example, the core enclosure can provide a center pivot for the coring drill tool. Furthermore, an easy access core enclosure could include a coring-drill-bit-resistant top surface, to avoid damage to the easy access core enclosure. Furthermore, an easy access core enclosure could include a dual nested enclosure design with concentric tapered side walls (to ensure good wall-surface-contact for good thermal conductivity).

"peripheral electronics" is defined as electrical devices or circuits that help control electricity flow to or from capacitors in the asphalt. For example, peripheral electronics can be used (inside and/or outside of a dynamic capacitor core) for protection from short circuits, protection from excessive-temperatures, protection from over-voltages, efficient routing of electrical energy, electrical load balancing, part of a dc-to-ac inverter, are prevention, or the timing of operational phases (e.g. pre-charging or load connection).

"explosion-damage limiting enclosure" is defined as a specially designed core enclosure that includes substantially empty volumes accessible via appropriately weakened ports in order to contain expanding gases. For example, if a short circuit occurred in a high-energy dynamic capacitor core, then a significant (but limited by the distributed-nature of the whole system) energy could be released in the form of an explosion (rapidly expanding gasses). Those gasses would do little, if any, damage to things above the asphalt, if the gases expand safely into said substantially empty volumes under the asphalt.

"heat cell" is defined as a region containing an energy absorbing surface, an energy emitting surface, and a heat storing volume that interacts with a nearby dynamic capacitor core. For example, a rectangular, hexagonal or circular region of asphalt road may be a heat cell for a dynamic capacitor core placed near the center of the rectangular, hexagonal or circular region.

"dynamic capacitor energy system" is defined as the overall functional unit that uses dynamic capacitor cores to convert thermal energy into useful electricity.

"non-core dynamic capacitor system node" is defined as an electrical circuit node that is not physically part of a dynamic capacitor core, but is electrically connected to part of the overall dynamic capacitor energy system. For example, some non-core dynamic capacitor system node are nodes at wire junctions that electrically connect one or more dynamic capacitor cores to a temporary energy store, to a pre-charging energy source, to a dc-to-ac inverter, to electrical loads, to over-temperature protection devices, to over-voltage protection devices, to over-current protection devices, or to system functionality monitoring equipment.

"inter-core wiring" is defined as the electrical circuits formed by electrical conductors that electrically connect one or more dynamic capacitor cores with other dynamic capacitor cores and possibly non-core dynamic capacitor system nodes. For example, such connections can be in nearly any combination of series and/or parallel connections of dynamic capacitor cores. Typically, these electrical conductors are copper wires with electrically insulating coatings. Furthermore, inter-core wiring may utilize high voltage insulation and low-labor (quick-to-connect) connectors, such as insulation displacement connectors (IDC). Slack wire regions may be included to allow for asphalt movement (than can occur after installation). Dual-use wiring (which conveys heat and electric charge) is one way to reduce costs.

"dynamic capacitor installation" is defined as a sequence of operations that result in dynamic capacitor cores and their associated inter-core wiring being encapsulated in asphalt and ready for functional operation. While, various dynamic capacitor installations are reasonably obvious, a few are innovative, such as the following installations:

Installation example 1: Unroll a special "fabric" from a large reel carried on a truck, where this "fabric" can contain inter-core wiring with connectors for connection to the dynamic capacitor cores. Installation example 2: Alternatively, the "fabric" can contain pre-wired inter-core wiring and the dynamic capacitor cores themselves. Installation example 3:

A hole can be drilled, at a small angle like 25° to an asphalt surface, through a small opening in the asphalt surface. Another distant opening in the asphalt surface is where another hole can be more-vertically-drilled in order to intersect the first hole, thereby leaving a hollow conduit for associated inter-core wiring, but with only minimal asphalt disruption. Note that some installations can be scheduled to coincide with regularly scheduled road resurfacing. Conventional asphalt laying machines can be used for encapsulation.

"radiated energy modulator" is defined as one or more devices that select between high-energy and low-energy radiation paths. This modulator can change at times controlled by a winter-summer cycle, night-day cycle, or hour cycle.

"conducted energy modulator" is defined as one or more devices that select between high-energy and low-energy conduction paths. This modulator can change at times controlled by a winter-summer cycle, night-day cycle, or hour cycle.

"convection energy modulator" is defined as one or more devices that select between high-energy and low-energy convection paths. This modulator can change at times controlled by a winter-summer cycle, night-day cycle, or hour cycle.

"passive relative motion configuration" is defined as a spatial arrangement of energy modulators and dynamic capacitor cores, that are spaced apart such that said dynamic capacitor cores alternate between high and low temperatures as the sun effectively moves from sunrise to sunset. Examples are sets of gratings with dynamic capacitor cores, loovers with dynamic capacitor cores, trees with dynamic capacitor cores, windows with dynamic capacitor cores, buildings with dynamic capacitor cores, and shades with dynamic capacitor cores.

"active relative motion configuration" is defined as spatial arrangement of energy modulators and dynamic capacitor cores, that are actively moved relative to each other, in order to alternate the temperature of dynamic capacitor cores between high and low values. Examples are motor-driven rotating occlusions, revolving reflectors, and sliding thermal insulator panels.

"inductance-based circuit for low-loss pre-charging" is defined as an electrical circuit that efficiently controls charging of one or more capacitors while minimizing energy loss to heat or other undesired forms of wasted energy.
Typically, the inductance is wound on a high-efficiency torroidal ferrite core, so that oscillating energy cycles are locally contained and reapplied to the capacitor.

"dc-to-ac inverter" is defined as an energy conversion device that modifies the energy form an energy converting variable capacitor, conveyed through inter-core wiring, into a standardized electrical energy form. For example, two standardized electrical energy forms are 120 Volts at 60 Hertz and 120 Volts at 50 Hertz. A typical dc-to-ac inverter includes many of the same functions that a typical photovoltaic inverter includes. Also, it may include one or more inductance-based circuits for low-loss pre-charging of dynamic capacitor cores, a circuit to avoid applying abrupt voltage change to dynamic capacitor cores, a microprocessor software or firmware to effectively control pre-charge of dynamic capacitor cores, energy transfer to or from other non-variable capacitors, load connection and disconnection and protection devices. Circuits intended to avoid applying abrupt voltage change may include a means of switching from multiple voltage sources, each with a small increment above others. Dc-to-ac inverters can include solid state switches (e.g. FETs, IGBTs, SCRs, Transistors) ground fault detectors, short circuit protection, high voltage shut-off, analog-to-digital converters for sensing voltage or charging state of variable or non-variable capacitors, or connection to the electric grid or connection to an isolated end-use location.
Continuation of

DETAILED DESCRIPTION OF THE INVENTION

Figure 1:
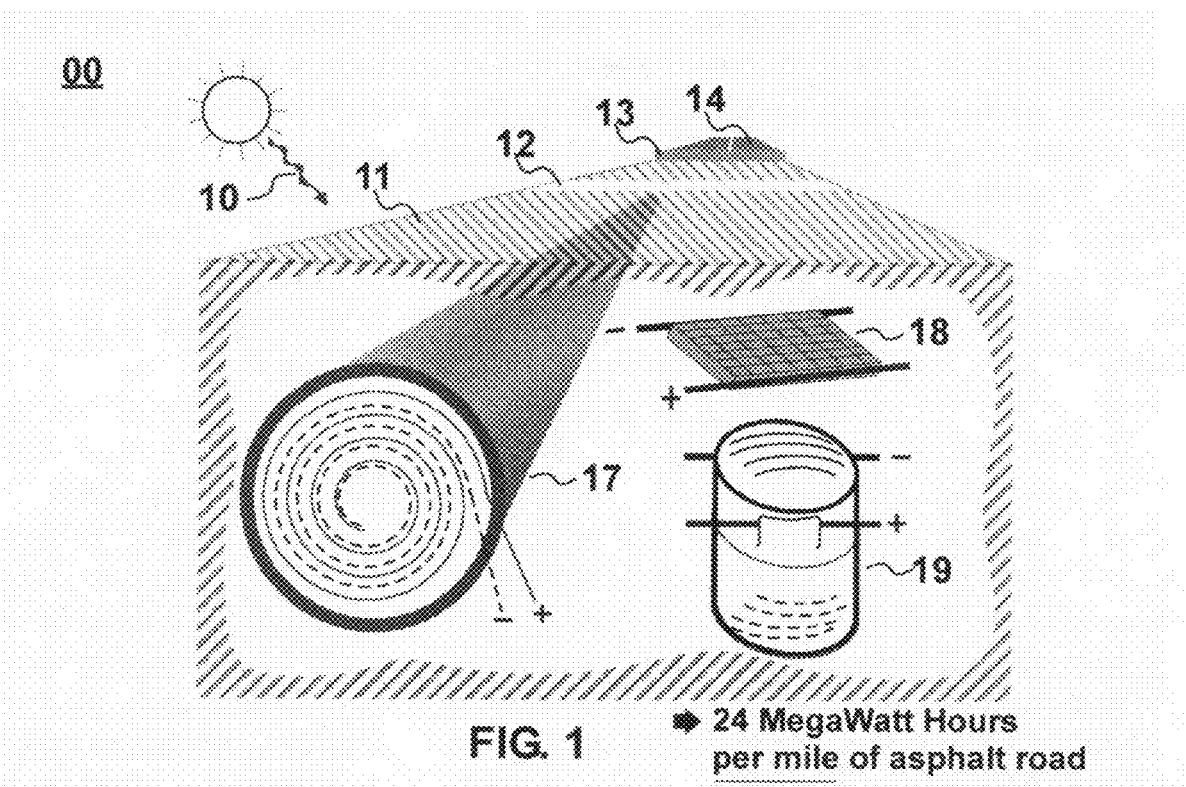
FIG. 1. This perspective drawing shows examples of some components in the energy system. They are buried in an asphalt road, as viewed from one sidewalk, through a cutaway window in the asphalt. (Omitted for clarity, are components for heat conveying and electrical wiring).

The preferred embodiment of the present invention is an energy system, part of which is buried in an asphalt road, street, driveway or parking lot. FIG. 1 shows examples three different kinds of core enclosures 17, 18, 19 buried in asphalt 11. (Typically, just one kind of core enclosure is used per installation). FIG. 1 shows a view from a nearby sidewalk, through a cut-away window in the asphalt. A road centerline 12, distant curb 13 and distant sidewalk 14 are shown to clarify the perspective view.

The long horizontal cylindrical object 17 encloses a dynamic capacitor core with its (+) and (−) terminals electrically connected to capacitor "plates" called electrodes here. Here, the two electrodes, extend the nearly the length of the enclosure 17 and have edges represented by solid (+) and dashed (−) curves. As will be explained later, this large capacitor converts thermal energy to electricity, as well as storing that electricity for immediate or delayed use.

Likewise, the lower profile, heavy load bearing, core enclosure 18, and the vertically cylindrical core enclosure 19 convert thermal energy to electricity, as well as store that electricity for immediate or delayed use.

Figure 2:
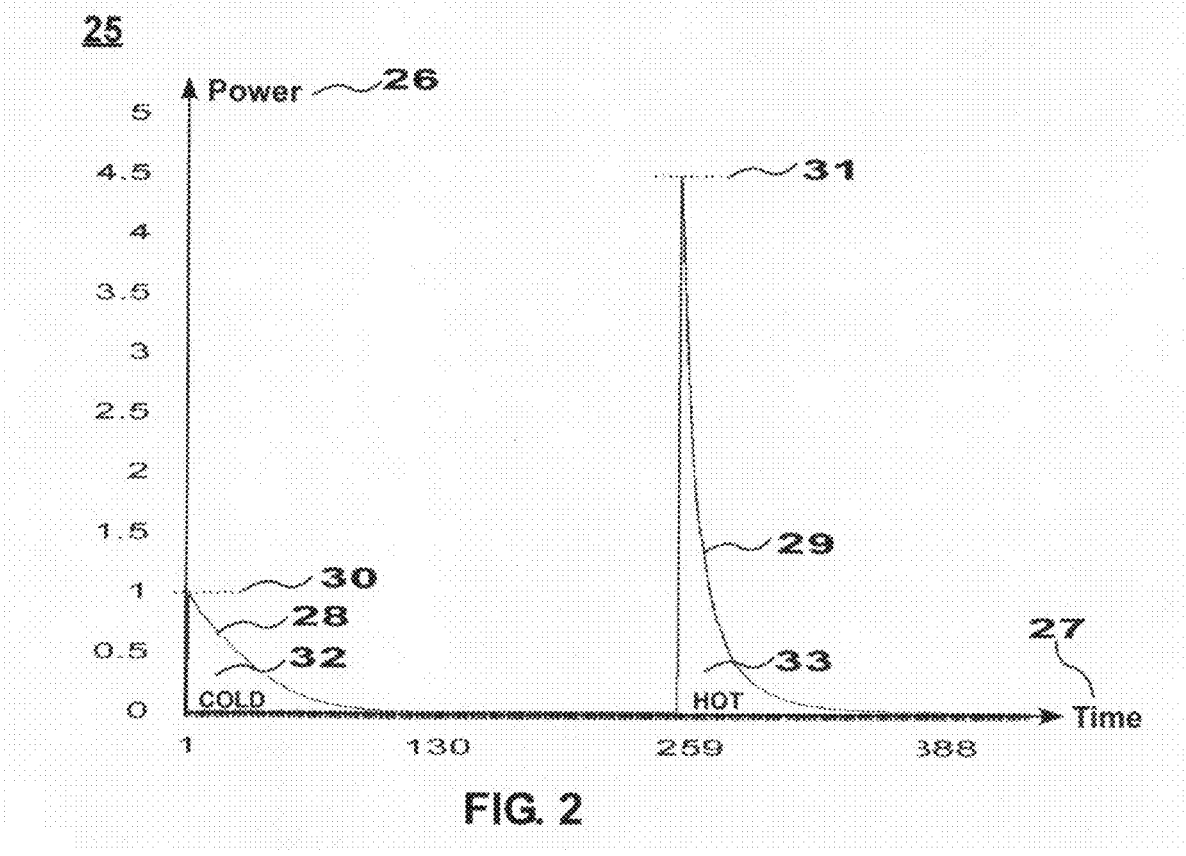
FIG. 2. This graph of measured (not just theoretical) electrical power vs. time shows a cold-capacitor-power curve and a subsequent heated-capacitor-power curve. Energy values are the areas under the two curves. Note the significant gain in electrical energy due to heating capacitors.

FIG. 2 shows actual measured data from a small-scale version of the present invention. Electrical power 26 is plotted against time 27. A "cold" curve 28 shows the pre-charging energy 32 that was put into a relatively cold energy converting variable capacitor like those enclosed in 17, 18 and 19. After time 130 (units are multiples of 125 milliseconds), the same capacitor is heated by sunlight, or the like. Next, starting at time 259, the relatively hot capacitor is tested to see how much energy 33 it contained. After numerically integrating the areas under curves 32 and 29, it is noted that the hot capacitor had 1.75 times the energy of the cold capacitor. That is, a significant quantity of the thermal energy from the sun was converted to electricity. It is instructive to notice the large peak voltage gain 31-30, too. Unless you actually measure energy gain, as was done by the applicant in FIG. 2, it is unlikely you would correctly assess the actual electrical energy gain from heating the capacitor. This is because some of the increased voltage is just the non-useful release of extra work done while pre-charging the capacitor. Only after actually measuring the electrical energy yield fraction, which was 1.75, can you be confident that indeed a significant electrical energy gain occurs. So the present invention can spawn more confident investments.

Although the specific capacitance-controlling parameter used in FIG. 2, is temperature sensitive dielectric "constant," other parameters can control the capacitance. All such parameters are variations of the principles illustrated in FIG. 3, 4, 5, 6, 7, 8 or 9.

Figure 3A:
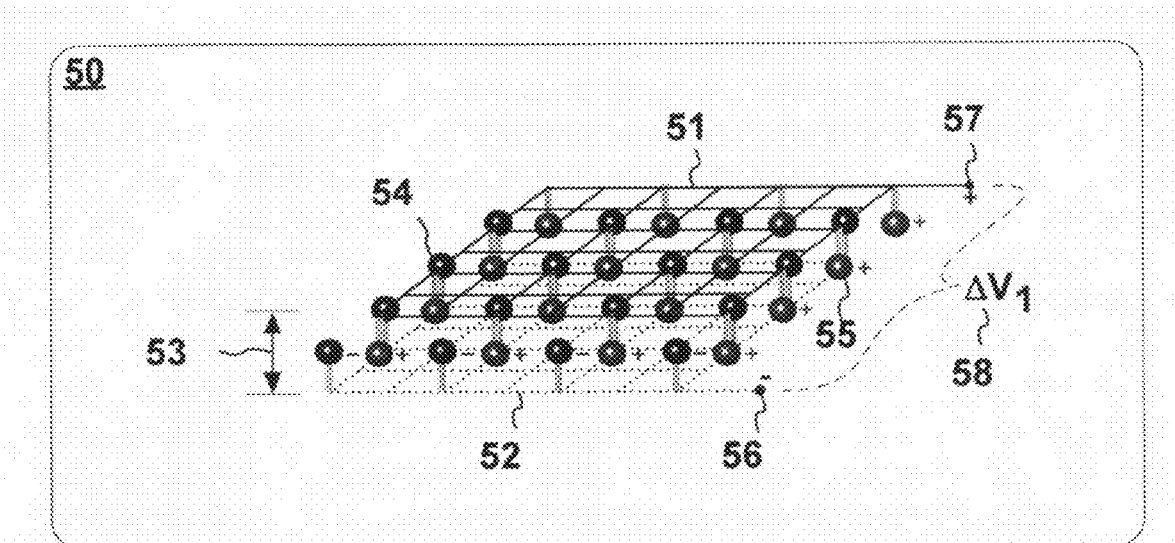
FIG. 3a. This perspective drawing illustrates two groups of oppositely charged structures that are in close proximity. This is a relatively low-energy state. Note how charge-neutral many regions are.

FIG. 3a shows two electrically charged regions 51, 52 (typically joined by electrical conductors) that are in close proximity 53. Note that the voltage difference 58 is low, because the opposite charges (e.g. 54 and 55) are already as close as they can be, without arcing, tunneling, or the like. The configuration 50 is a low energy state and is essentially charge-neutral.

Figure 3B:
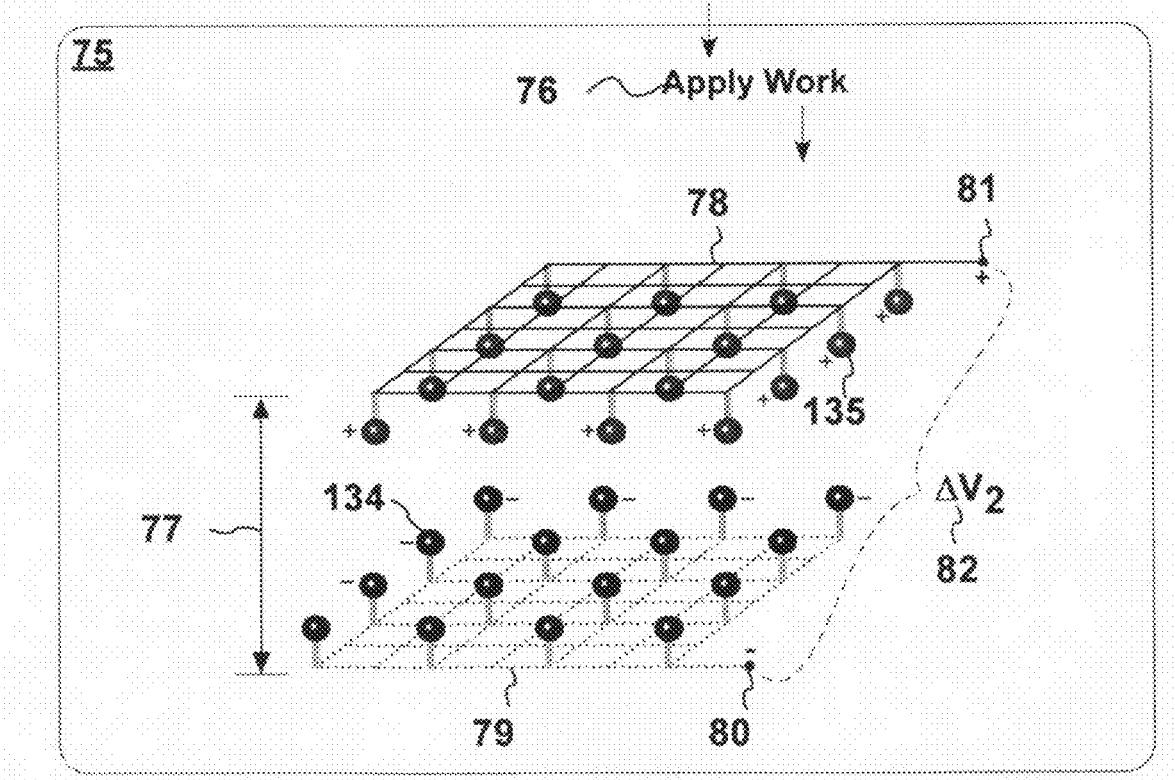
FIG. 3b. This perspective drawing illustrates two groups of oppositely charged structures that are in distant proximity. This is a relatively high-energy state. At atomic or molecular separations, large amounts of work (energy) must be done to move from such low-energy to high-energy states. Likewise, large amounts of energy can be stored in such high-energy states.

Now, as shown in FIG. 3b, an external energy source is used to do work on configuration 50 to transform it into configuration 75 and to separate the charged regions to a distant proximity 77. This greatly increases the new voltage difference 82, relative to 58.

Digging a bit deeper, FIGS. 4, 5 and 6 show several ways to achieve a voltage gain. FIG. 4a shows two isolated charged particles in close proximity. FIG. 4b shows the same charged particles at a wider separation after work had been done to cause the greater separation.

FIG. 5a shows a relatively large area of electrically conductive surface 127 that contains like-charged (mutually repelling) particles like 102. It takes work to confine these repelling charged particles to a smaller area 128.

FIG. 6a shows two charged particles 101, 102 with intervening dipole 151 which naturally tends to orient so as to oppose the electric field 152 between charged particles 101 and 102. Now, if the dipole 151 is removed, or weakened, as shown in FIG. 6b, then the voltage 153 is rises. A capacitor's dielectric material can act like the dipole 151. A change in temperature of the dielectric material can cause a weakened dipole. For example, see FIGS. 8, 9, 24, 25 and their respective descriptions.

Several basic physical arrangements of variable capacitor electrodes are depicted in FIG. 7a through FIG. 7e, all of which are intended to include dielectric materials and also intended to be capable of variation in capacitance due to changes in electrode separation, electrode area or dielectric dipole strength, following the principles illustrated in the simple examples of FIGS. 4, 5 and 6. Likewise for the arrangements depicted in FIGS. 7b through 7e.

FIG. 7a shows two parallel electrodes. (Electrodes can be essentially free of sharp corners and edges, too).

FIG. 7b is an end view intended to represent coaxial electrodes that are elongated (into the plane of the paper) that may slide or rotate relative to each other. (If rotation is used, then an electrode or dielectric asymmetry, not shown in FIG. 7b, is required).

FIG. 7c is an end view intended to represent a rolled-up pair of electrodes that are elongated (into the plane of the paper).

FIG. 7d is a perspective view of a vein-like or artery-like geometry of essentially coaxial electrode pairs. It will be practical to build or grow such variable capacitors with biology-inspired techniques.

FIG. 7d is a top view of a hierarchically combined set of essentially coaxial electrode pairs, somewhat like the hierarchy of bundles-of-bundles of muscle elements. It will be practical to build or grow such variable capacitors with biology-inspired techniques.

In many cases, such as in FIGS. 7b through 7e, larger capacitors can be constructed by adding more "layers" (not limited to just planar layers) of electrode pairs that are electrically connected in parallel.

A fundamental principle of materials undergoing phase changes is illustrated in FIG. 8a, which graphs temperature 201 vs. applied energy 202. The curve 203 has a flat region 204 in which the temperature substantially stops rising, despite the steady addition of energy. The explanation is this: The "seemingly missing" energy is going into powering additional "degrees of freedom" (e.g. molecular vibrations, rotations, etc.) that are enabled only at specific temperatures. For example, the phase change effect region 204 occurs when ice is heated into liquid water, since the liquid molecules can move freely in many more ways that those of ice.

A somewhat analogous phase change takes place when some dielectric materials such as Barium Titanate or Lead Zirconate Titanate are heated. These phase changes can substantially effect the materials' dipole strength, dielectric "constant" or permittivity, as further described in FIG. 9 and FIG. 8.

FIG. 8b schematically represents a cold unit cell 225 within a perovskite ceramic. (Here, this example uses Lead Zirconate Titanate or PZT). Notice that, when cold, the positive Ti ion 229 and 230, is off-center (higher than the center of the four negative oxygen ions 227), thereby causing a substantial net polarization 228 due to the strong dipole field.

However, after heating the material to a specific higher temperature (Curie temperature), the positive Ti ion 253 and 254 becomes substantially centered, the dipole is much weaker and the polarization field substantially disappears. Thus, a pre-charged capacitor with this dielectric material will rise in voltage because the dipole that ordinarily opposed the main electric field is substantially gone, as illustrated in FIG. 6 and empirically measured FIG. 2, although the perovskite used in FIG. 2 was Barium Titanate or $BaTiO_3$.

Notice that we should expect a "flat region" with this perovskite somewhat like the flat region 204 in FIG. 8a. This means some thermal energy is being converted in order to center the ions and reduce the dielectric constant.

Digging a bit deeper, FIG. 9a illustrates a PZT perovskite ceramic unit cell when cold. Notice the changed distances 282 and 285 between FIG. 9a and FIG. 9b. For reference, 284 is the Ti positive ion, 278 is a negative oxygen ion 281 is a lead atom. Thus, it appears that fairly complex quantum mechanical interactions occur during such phase changes. In this example, they involve $Ti—O_2$ interactions as well as $Pb—O_2$ interactions.

Here, it is convenient to note that such "flat regions" can be used to effectively cool asphalt because a perovskite-bearing asphalt temperature may plateau despite the sun's continued injection of thermal energy. This "heat island reduction" benefit and "asphalt temperature extreme avoidance" can accompany the benefits of conversion to electricity and energy storage (in both thermal and electricity forms).

Figure 10A:
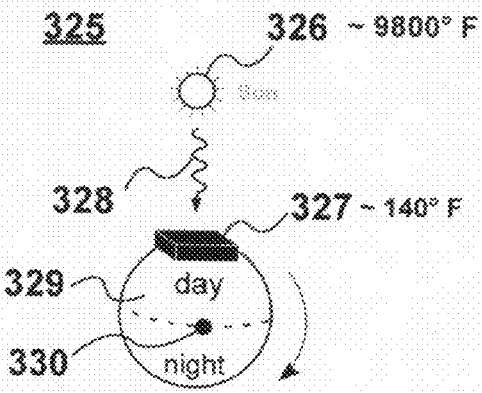
FIG. 10a. This figure illustrates the "simple elegance" of a daily 24-hour-energy-transfer-cycle as the Earth efficiently rotates on its axis in space. A representative volume of asphalt is heated in the daytime by a net absorption of radiant energy from a 9800 degree Fahrenheit source (the sun).
Figure 10B:
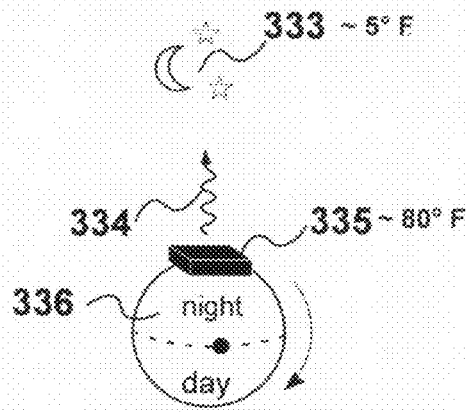
FIG. 10b. As the Earth continues to rotate, the representative volume of asphalt can be exposed to a surprisingly cold night sky (as low as −5 degrees Fahrenheit). Thus, the representative volume of asphalt is cooled in the nighttime by a net emission of radiant thermal energy. Note that the long 24 hours cycle time motivates us to incorporate energy storage in this dynamic capacitor energy system.

FIG. 10 schematically represents radiant energy absorption and emission of a slab of asphalt 327, 335 at daytime 329 and nighttime 336, as the earth rotates about its axis 330.

In the daytime, the sun 326, at about 9800° F. radiates heat to the slab, which can be at about 140° F. Thus, daytime net flow of radiant energy is into the slab.

In the nighttime, the asphalt slab may be about 80° F., which radiates out into a nighttime sky, which can have a temperature of as low as minus 5° F., on a clear, dry night. Thus, nighttime net flow radiant energy is out from the slab.

Notice the "elegant" simplicity and efficiency of this 24-hour energy transfer cycle (e.g. frictionless Earth-axis bearings that show no wear). This night-day cycle can be used to convert solar energy to electricity by a preferred embodiment of the present invention. (Likewise, earth-moon gravitational (tide) changes have similar elegant simplicity, and can power alternative embodiments of the present invention).

FIG. 11 is a schematic diagram of a fundamental electrical circuit used in dynamic capacitor energy systems. Electricity source 351 can be used to pre-charge a variable capacitor 359 by closing (mechanical or electronic) switch 354 and controlling the pre-charging current by element 353. For low-loss charging, element 353 should not be substantially resistive, otherwise very high losses of energy (commonly of half the applied energy) in the form of heat will occur, as depicted in FIG. 26.

In FIG. 26, resistance 806 does limit pre-charging current 805, but it does so by converting energy to heat 804, which is an energy form that is difficult to recover for re-use in pre-charging. (Voltage source 801 connects through switch closed 802 to pre-charge capacitor 803).

Should someone try to pre-charge capacitor 359 with no current limiting, then about half the energy will be wasted by switch-contact arcing and RF radiation.

The preferred embodiment of element 353, in FIG. 11, is a high-efficiency inductance, or the like, in which nearly all magnetic field energies are easily recovered and re-applied as pre-charging energy.

One such use of an inductive element is shown in FIG. 27, in which, the substantially-purely-inductive element 829 is made of low resistance wire wound on a highly-energy-efficient toroidal core. The parasitic resistance represented by element 828 should be made as small as possible. Thus, when electricity source 826 transitions from low voltage to higher voltage level 827, the circuit 825 will oscillate as in graph 832, which shows the voltage between nodes 830 and 831 vs. time. Importantly, the energy recovered from the changing magnetic field in 892 is automatically re-applied to precharge capacitor (or variable capacitor) 702. Thus, low-loss pre-charging can be achieved.

Once a relatively cold variable capacitor 359, in FIG. 11, is efficiently pre-charged, then switch 354 is opened and heat is applied, often from solar radiation, until the hot temperature of 359 rises sufficiently to raise the voltage between at node 357 relative to node 362. Next, switch 360 (mechanical or electronic) is closed in order to supply electricity to the load 361, which can represent motors, lights, air conditioners, computers, and any other common electrical load.

FIG. 12 is a stack of three plots of solar power 376, asphalt temperature 377 and electric power 378 vs. time. (The detailed curves are only roughly and qualitatively representative of the sequence). Three representative days are shown, and within each is a bell shaped solar power curve 379, which powers the asphalt temperature curves 380 and 381. Curve 380 has higher peak-to-peak temperatures and assumes no dynamic capacitor system in the asphalt, whereas, curve 381 assumes a dynamic capacitor system is in the asphalt. The bottom curve shows time spans with significant 382 available electricity, as well "gaps" 383 in available electricity.

Generally, it is desirable to have sufficient electricity available, at all times. To that end, persons experienced in the art will have no problem understanding dynamic capacitor energy systems that fill the gaps by one of several means. For example, by choosing a plurality of dielectric materials with different Curie temperatures (e.g. by mixing different elements or different ratios of elements), one dynamic capacitor energy system's gaps can be filled from other dynamic capacitor energy system's non-gaps. Additionally, electric grid-connected systems can use their natural geographically distributed daylight timing to fill gaps. Furthermore, temporary energy storage (thermal or charge-based) within dynamic capacitor energy systems can spread out energy supply to better match electricity demand.

In addition to night-day cycles of energy conversion cycles, shorter than 24-hours cycles (called hour-cycles here) can be created by various means, such those illustrated in FIG. 13, FIG. 35, and FIG. 36.

FIG. 13a shows the sun 401 emitting radiant energy in direction 402 and the resulting nearly parallel rays that hit the earth 404 at angle 405 at a given time of day. As the day progresses, angle 405 changes and the rays alternately hit different arrays of dynamic capacitor cores. For example, with the angle 405 shown in FIG. 13a, rays hit representative dynamic capacitor core array elements 409 and 410, but do not hit representative dynamic capacitor cores array elements 411 and 412 because the rays are absorbed, reflected, refracted or diffracted due to representative energy redirector array elements 406 and 407. A few minutes later, the reverse will be true. That is, rays will not hit representative array elements 409 and 410, but will hit representative array elements 411 and 412. This alternation can repeat a plurality of times in a day. Note that the array elements will usually be extended into the plane of the paper in FIG. 13a, as shown in perspective sketch 13b, for example. The longest dimension of these array elements should be laid out substantially North to South. These dynamic capacitor core array elements can utilize dynamic capacitor cores and core enclosures like those in FIG. 1. Some energy redirectors are more efficient than are others. For example, Fresnel and long cylinder-like lenses can efficiently concentrate light. Likewise, curved mirrors can be used (although the vertical positions of redirector array vs. dynamic capacitor core arrays should be swapped, relative to that in FIG. 13).

Thus, it has been shown how energy conversion cycles, much shorter than 24-hours can be realized.

FIGS. 14, 15, 16 and 17 employ use directed force as the capacitance-controlling parameter.

FIG. 14 shows how various massive structures 426 and 429 on Earth can be used to concentrate energy for conversion and storage with dynamic capacitors. Usually, the energy source is the sun and the energy-cycle period is 24 hours. Dynamic capacitor core 430 gets compressed when 426 moves toward 429. Object 428 is used to limit excessive forces that might otherwise crush 430. For example, a dynamic capacitor energy system can be installed in a fault, crevice or gap between two massive rock and soil structures. Here, the thermally induced relative movement of the sides of the gap can exert directed forces on dynamic capacitors and thereby generate enormous quantities of electrical energy. This figure assumes primarily compressive forces. The preferred embodiment electrode topologies are those of FIG. 7b and FIG. 7e.

The fundamental principle can be those of FIG. 4, 5, or 6.

FIG. 15 illustrates an approach is like the approach described for FIG. 14, except that the primarily forces are conveyed as tension in strong cables 65 and 66 to dynamic capacitor core 67. Note that the approaches in FIG. 14 and FIG. 15 can be combined, too.

FIG. 16 illustrates top views of cable-connected energy concentrator subsystems. Strong steaks 476, 477, 480 and 484, in the Earth act as anchor points for systems 475 and 479 of cables, such as 481, that apply tension, the directed force, to representative dynamic capacitor cores 478 and 482. Here, the 24-hour solar heat cycles expand, then contract, then expand, then contract dark colored cables. The dynamic capacitors can be installed at the ends of cables, wherein variations in cable tension can drive the movable parts of said dynamic capacitors. Note that massive earth structures can be what expands and contracts, while the cables mostly convey the tension changes. FIG. 16a shows a linear array topology of cables. FIG. 16b shows a radial topology. FIG. 16c shows a hexagonal group of systems like 479, wherein, steaks can be shared between hexagonal cells.

FIG. 17 represents water 502-based implementations of dynamic capacitor energy systems. Here, water levels or currents drive dynamic capacitor moving parts. Float 501 moves relative to the solidly-embedded anchor 504, thereby varying tension, a vertically directed force, in the cable between 501 and 504 and exerting tension on dynamic capacitor core 505. For example, in FIG. 17a, can represent a low-tide water level and FIG. 17b a high-tide water level. A means of avoiding excessive tension that might otherwise tear apart the dynamic capacitor core should be included, such as an elastic element or spring within cable 508. FIG. 17c collects alternating forces on paddle 506 due to changing water currents and applies the resulting alternating laterally directed forces to dynamic capacitor core 505 via lever arm 507. As with all dynamic capacitor energy systems, the energy conversion cycle includes pre-charge phase. Note that an appropriate energy source can be the alternating gravitational pull from Earth-moon relative motion.

FIG. 18 is a top view of one example of a layout of a heat cells such as cell 526, dynamic capacitors' inter-core electrical wiring such as wire 528 and 529 and heat conveying elements such as 526. Although this example is hexagonal, rectangular layouts are practical, too. The wiring can be arranged many different ways (e.g. almost any combination of series and parallel circuits to accommodate various voltage, current and fault isolation requirements). The shape and material of the heat conveying elements, can vary widely (e.g. see FIG. 19 and FIG. 20). In some cases, asphalt itself can be the heat conveying element.

FIG. 19 is a top view showing a dynamic capacitor core enclosure 550 with tubular heat conveying elements, such as 553 and 554, and a manifold 552 for fluid distribution. For example, said tubes can be fluid-filled and form partially evacuated heat pipes or other simpler liquid heat-carrying subsystems. Also, this representative enclosure has a center pivot 555, about which a asphalt-coring bit can rotate to remove asphalt above the enclosure. This can facilitate repair or upgrade of a removable inner part of a dual nested enclosure (927 in FIG. 30) from a more permanent outer enclosure 551.

FIG. 20 is a perspective view of a low profile enclosure of a dynamic capacitor core. Low profile may be needed to avoid conflicts with city plumbing buried in asphalt roads. Strength is important if heavy automobiles travel on the asphalt, so this enclosure is internally ribbed with interlocking walls and a plurality of dynamic capacitors are arrayed inside. The triangle-like appendage 579 is one representative heat conveying element (e.g. heat fin). A plurality of such fins can be fastened 580 (welded, bolted, riveted, etc.) to the high thermally conductivity enclosure box 576. Part of the inter-core electrical wiring 577 and 578 is shown. Also, see FIG. 32 which shows more detail of this low profile enclosure box.

FIG. 21 is nearly identical to FIG. 11, and is juxtaposed with FIG. 22, for convenient reference.

FIG. 22 shows a circuit diagram including a capacitor 626 for intermediate energy storage. The low-loss pre-charging circuit 608, 632 and 602 operates as already described. Once the pre-charge enabled energy converting variable capacitor 605 accumulates sufficient energy, due to added thermal energy, some of that energy can be temporarily stored in capacitor 626. It is stored for later use in electrical load 606 through closed switch 604 (mechanical or electronic) and low-loss charging control circuit 633 like element 353 in FIG. 11). Alternatively, a battery or other energy storage device can be substituted for capacitor 626.

FIG. 23 is a circuit diagram that illustrates various optional fault detection, fault isolation, and status monitoring electrical subsystems 653, 654 and 655. In this diagram, each conventional variable capacitor symbol can represent a dynamic capacitor core. Faults such as over-current, over-voltage and over-temperature can be conventionally detected and action can be taken to isolate (electrically disconnect) the faulty dynamic capacitor core from paths 651 and 652 to other parts of the larger system. Likewise, element 656 can fault-protect larger portions of the overall system. Status of a subsystem can be conveyed, by radio frequency RF carrier 657 or substantially dedicated wires. Likewise, timing signals for switches 602, 630 and 604 can be conveyed by substantially dedicated wires or RF.

FIG. 24a is a perspective drawing that depicts a relatively cold 677 dynamic capacitor with a temperature sensitive dielectric, comprising a plurality of perovskite-like cells 683.

Here, the ions are not centered, like 679, and there is a large polarization field 678, that opposes the electric field from the charges on the top 676 and bottom 684 plates. When polarization is high, the capacitor is pre-charged from an electrical source 682 by closing switch 680.

FIG. 24b is a perspective drawing that depicts the same dynamic capacitor shown in FIG. 24a, except at a hotter 702 temperature, wherein the dielectric ions are much more centered, like 703, and therefore, the polarization is essentially zero 701. The voltage between the top and bottom plates 708 is now higher than that of FIG. 24a, due to the added thermal energy that did work to rearrange the atoms in the ceramic cells. Since the capacitor now stores more electrical energy that used to pre-charge the capacitor, we can connect an electrical load 706 by closing switch 705 to uses some of the newly added energy.

FIG. 25a is a highly magnified end view of a dynamic capacitor, showing conceptual polar molecules 734 and 735 in sphere 728 and sphere 729 that are designed to operate somewhat like the nearly-centered ions as found in perovskite ceramics, except with even higher effectiveness. Sphere 728 is a magnified view of sphere 737. Sphere 729 is a magnified view of sphere 738. Two states 728 and 729 are shown (although they would actually be co-located but occur at different temperatures). One state of the molecule 728 provides very high polarization that opposes the main electric field between the top and bottom plates. The other state 729 is orthogonal to the main electric field between the top 727 and bottom 736 plates. Note the curves 735 in the molecule in sphere 729. (This can use a "molecular-scale version" of the principles used in bi-metalic benders). Within sphere 728, positive ion 730 is coupled to pivot point 723 via molecule 731. Also, Negative ion 733 is coupled to pivot point 723 via molecule 732.

When cold, the molecule 734 is straight and its dipole-like field strongly opposes the electric field from the plates. However, when hot, the same molecule reconfigures itself into the curved version 735, which does not oppose the electric field from the plates.

FIG. 25b is a highly magnified end view of a dynamic capacitor, showing conceptual polar molecules designed to move somewhat like that in FIG. 25a. Two states are shown (although they would actually occur at different temperatures). One state 751 of the molecule provides very high polarization that opposes the main electric field between the top and bottom plates. The other state 752 is orthogonal to the main electric field between the top and bottom plates. Note the lack of curves in the molecule.

FIG. 25c is a highly magnified end view of a dynamic capacitor, showing conceptual polar molecules designed to move somewhat like that in FIG. 25b. The difference is that these molecules either shrink and expand 776 or rotate 777 end-for-end. In FIG. 25, it is important that these molecules (except 776) or their containing spheres can rotate efficiently. For this reason, liquid crystal-like molecules are likely candidates.

FIG. 26 is an electrical circuit diagram that emphasizes the energy loss 804 in pre-charging when using resistive current 805 limiting, as opposed to using low-loss methods as in FIG. 27. Independent of the resistance value of 806, half of the energy applied from voltage source 801 will be wasted as heat 804 when switch 802 is closed.

FIG. 27 is an electrical circuit diagram that shows a low-loss pre-charging (or charging) circuit. The substantially-purely-inductive element 829 is made of low resistance wire wound on a highly-energy-efficient toroidal core. The parasitic resistance represented by element 828 should be made as small as possible. Thus, when electricity source 826 transitions from low voltage to higher voltage level 827, the circuit 825 will oscillate as in graph 832, which shows the voltage between nodes 830 and 831 vs. time. Importantly, the energy recovered from the changing magnetic field in 892 is automatically re-applied to pre-charge capacitor (or variable capacitor) 702. Thus, low-loss pre-charging can be achieved.

FIG. 28 is similar to FIG. 1. The interior 858 of enclosure 857 can contain various configurations of pre-charge enabled energy converting variable capacitors. For example, a plurality of shorter such capacitors can be packed end-to-end and electrically interconnected inside enclosure 857. This could allow a reasonable amount of flexing of the enclosure 857, without undue stress on the capacitors. Alternatively, enclosure 857 could include a single longer pre-charge enabled energy converting variable capacitor. An advantage the spiral electrode configuration shown in FIG. 28 is the high efficiency of a roll-to-roll manufacturing. The (+) electrode 860 is in very close proximity to the (−) electrode 859, but separated by high quality dielectric with an effective temperature dependence.

Also shown in FIG. 28 are examples of optional rebar-like textures 120 for use on the outside of dynamic capacitor enclosures such as 857 along its circumference and length 852, in order to grip the asphalt or concrete encapsulant. Also, similar to the usual benefit from common steel rebar, these textures 120 and their core enclosures 857, 18, 19, 579, 553 and 926 benefit the integrity of the asphalt or concrete structure, and avoid undesired component-to-component relative movement, over time. This can be important especially under heavy pressures from automobiles and their lateral forces from acceleration and braking.

FIG. 29*a* is a perspective drawing of a deeper profile core enclosure. The domed top 978 and bottom 882 add strength. The lower portion of the enclosure 880 includes a thermal insulation layer 881 to insulate from the cooler asphalt under-layers. Some inter-core electrical wiring is electrically connected by (optional) insulation-displacement-connectors (IDCs) located behind protrusion 879. (The details of the IDCs' insulation piercing blades are not shown since they are commonly known). Of course, other non-IDC type of connectors can be substituted for the IDCs.

Also inside enclosure 880 is one or more pre-charge enabled energy converting variable capacitors. Generally, this capacitor has a spiral electrode configuration with its center-of-spiral axis vertically oriented and centered in the enclosure. Alternatively, a plurality of smaller variable capacitors can be interconnected within the enclosure. In order to evenly and effectively convey heat, a type of transformer oil or the like, can be used can fill gaps between capacitors and the enclosure interior, and this applies to all core enclosures.

Also shown in FIG. 29*a*, are three examples 883, 884 and 885 of series/parallel electrical wiring or dynamic capacitor cores, wherein, the dots each a represent dynamic capacitor core and the line segments each represent a multi-conductor wire or cable. The main point of examples 883, 884 and 885 is that nearly any voltage and current system requirement can be met by appropriate series/parallel connectivity.

FIG. 29*b* shows how the enclosure 903 that was described in FIG. 29*a* can be buried in asphalt 904 and its under-layers 906 and 907. Also, the thermally insulated bottom section 905 is shown, as well as a some of the buried inter-core wiring 901 and 902.

FIG. 30 shows a partially exploded diagram of a dual nested core enclosure 925. The bottom part 926 is more permanently embedded in asphalt. The removable upper part 927 of the enclosure contains the dynamic capacitor and connections 928 and 930 for inter-core electrical wiring. (Optional push-on IDC connectors are shown). Fins 933, 940 and 941 with high thermal-conductivity help convey the heat from a large heat cell (e.g. 526 in FIG. 18) to the dynamic capacitor core 929. The "curved breaks" in the fins indicate that the fins are actually longer than what is shown. Inside enclosure part 927, a vertical stack of disc-shaped capacitor electrode pairs, is illustrated in the volume indicated by 932. Note that any of the alternate capacitor electrode shapes can be substituted. Fasteners, with the approximate functionality of swivel fastener 942 can secure part 927 into the cavity 937. The sloped walls of 927 and cavity 937 provide good mechanical and thermal contact, and is somewhat self-adjusting, despite typical size variations in 927 or 937.

At the bottom of enclosure 925, is shown an optional explosion-damage limiting enclosure 938, which can provide extra volume for expanding gases, in case a capacitor explodes, due to some fault. This is intended to prevent surface asphalt damage that might otherwise result in a road hazard or repair expense.

As already described for FIG. 19, the present enclosure can be upgraded with a center pivot like 555, about which a asphalt-coring bit can rotate to remove asphalt above the enclosure. This can facilitate repair or upgrade of removable part 927. Such a pivot and a surrounding protective surface can be added above the top of part 927, taking care to leave access and clearance for 928 and 930, or modifications thereof.

FIG. 31 is a cross sectional view of an asphalt road 952 and under layers 951, wherein a drill 956 and bit 955 is used to make a slanted cylindrical hole for electrical wiring conduit. This allows minimal tear-up 953 and 954 of asphalt roads. Small caps, somewhat like very small manhole covers, can be used to cover holes 953 and 954 in asphalt layer 952 after a core is installed, repaired or upgraded. This can greatly reduce the cost and duration of installing dynamic capacitor energy systems.

FIG. 32*a* is a figure that shows a perspective view of a low-profile core enclosure 976, like that in FIG. 1 and FIG. 20. It protects and encloses pre-charge enabled energy converting variable capacitors and provides good thermal conductivity to its asphalt encapsulant, optionally via additional heat fins like 579 in FIG. 20. More detail is shown in FIG. 32*b* and FIG. 32*c*.

FIG. 32*b* shows a perspective exploded view of the top 977 and bottom 978 halves of the box shown in FIG. 32*a*. Horizontal walls like 978 interlock with perpendicular walls like 979, as further detailed in FIG. 32*c*. Also shown are four, of a plurality, of physically small dynamic capacitors 928 efficiently packed into the open volumes of the box.

FIG. 32*c* clarifies one way of constructing the partitions or walls (that may need to support heavy automobiles). One representative wall 984 (like 978) is perpendicular to another representative wall 988 (like 979). The slots 985 and 986 mutually interlock forming a strong set of load-bearing partitions. The curved openings like 987 allow wire routing. The tabs 983 with holes can be used to fasten the partitions or walls to the top and bottom plates, by inserting wires like 981 into the captive tabs like 983. Two convenient shapes of pre-charge enabled energy converting variable capacitors are cylindrical 989 and nearly rectangular solid 990, both of which can be made from rolled films.

FIG. 33 is like FIG. 2, except more detail is included for the readers' convenience. Again, this graph is from measured data A circuit, basically like that in FIG. 26, was used to make the measurements. The instantaneous voltage across a precision resistor 806 was measures under computer control, every 125 milliseconds by a 10-bit precision analog-to-digital converter. First, the 23° C. ceramic capacitor (actually ten parallel connected capacitors with Y5V temperature coefficients) 803 was completely discharged. Next, charging current through 806 was logged, starting with switch 802 closure. This produced the power-vs.-time curve 28 (see FIG. 2), after a simple conversion from the known resistance of 806 and its voltages. Switch 802 was opened. Next, the same (now charged) capacitor was heated to 60° C. and then discharged through resistor 803, but with voltage source 801 disconnected and effectively replaced with a zero-ohm wire. Again, current through 806 was logged starting with switch 802 closure. This produced the power-vs.-time curve 29 (see FIG. 2) after a simple conversion from the known resistance of 806 and its voltages. This constitutes a small-scale, proof-of concept, set of measurements. That is, as noted in FIG. 33, the capacitor value at 23° C. was only about 660 microfarads, which is exceedingly small compared to the actual cold capacitance values intended for the present invention. Likewise, the voltage of the voltage source was only 3 volts, again exceedingly low compared to the actual voltage values intended for the present invention. Nevertheless, the results show a 1.75 energy yield fraction in terms of electrical energy, a result that is expected to scale well with much higher capacitances and voltages, as extrapolated in FIG. 34.

Figure 34:
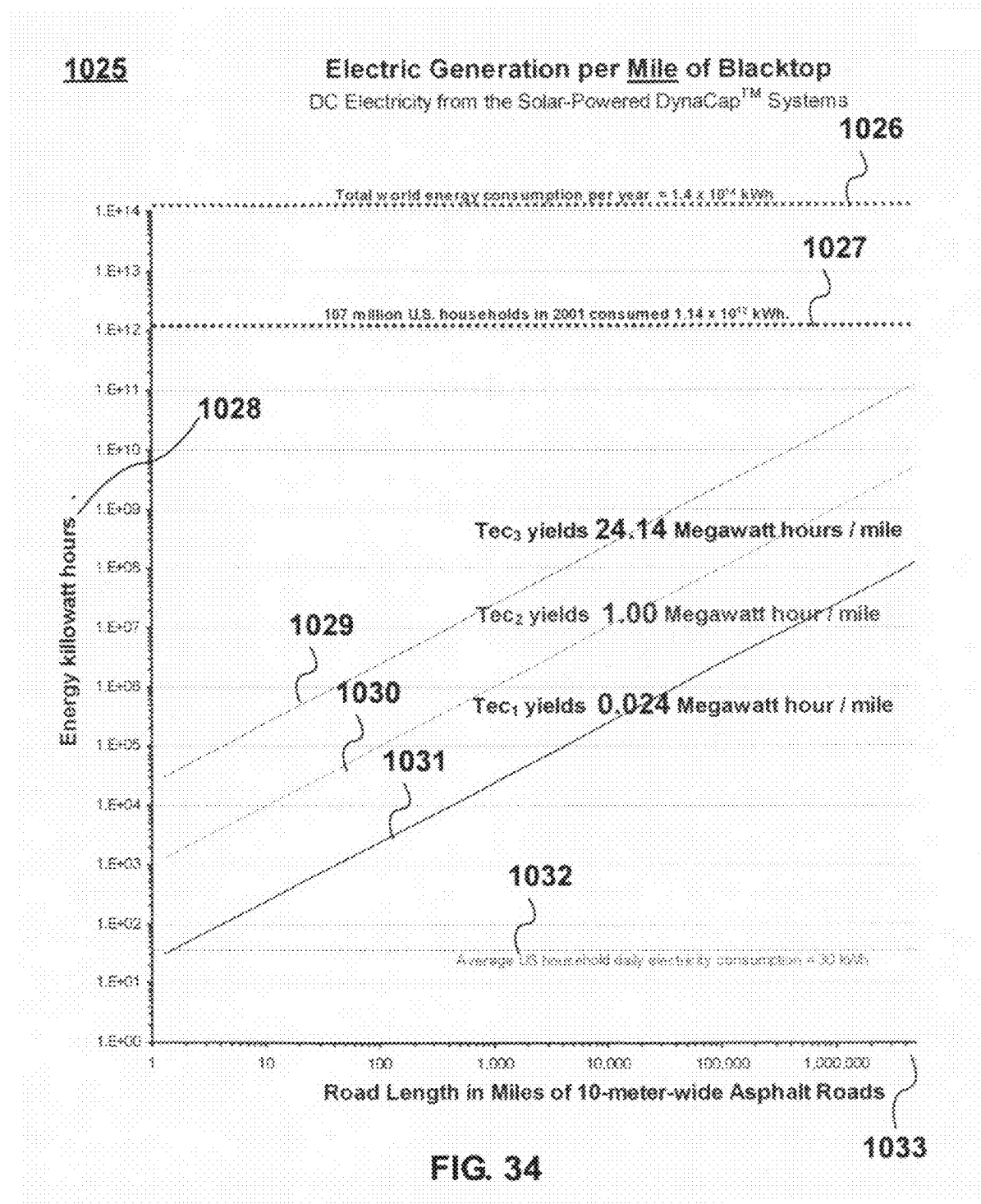

FIG. 34 shows a log-log plot of the theoretical energy 1028 vs. road length 1033. Three different dynamic capacitor technologies 1029, 1030 and 1031 are plotted. In addition, convenient energy consumption references are included, such as typical daily US household usage 1032, total US household usage 1027 and total world energy consumption 1026.

If installed on a large scale, this dynamic capacitor energy system could supply a large part of the world's energy needs. In order to simplify energy yield comparisons in this section, a somewhat arbitrary "standard" physical volume of actual capacitor is defined to be 10 liters. This may seem to be a rather large volume for each core. However, early versions of pre-charge enabled energy converting variable capacitors are likely to be physically large. As they are further developed, their size will likely be dramatically reduced, at which time, the standard volume may be only a fraction of one liter. For now, we use the conservative 10-Liter standard. Volumetric energy density is a critical distinguishing factor for these capacitors. Traditionally, capacitor volumetric energy density has been too low for practical use. However, recent developments from several different companies (e.g. EEstor inc. and 1st Lighten The Load Inc.) claim much higher volumetric energy densities. Three technologies are discussed here. The are Tec1, Tec2 and Tec3. Briefly, Tec1 is from general publications and has 8 Joules/cc, which is about $2 \times 10^{-3}$ kilowatt hours per liter, and means 0.02 kilowatt hours per core. Tec2 is from a company called 1st LTL and has over 300 Joules/cc, which is about $8.33 \times 10^{-2}$ kilowatt hours per liter and means 0.83 kilowatt hours per core. Tec3 is from a company called EEstor and had about 52 kWh/336 lbs, which means about 2 kilowatt hours per liter and means 20 kilowatt hours per core. Notice the range between the lowest and highest volumetric energy densities spans three orders of magnitude! It should be noted that EEstor is a very secretive company and their claims are controversial. Still Lockheed Corp. has inspected their technology and claims it is on track. Likewise, little is known about the $1^{st}$ LTL company. Nevertheless, the published patents of both companies are detailed and plausible. For now, all three energy densities are considered in this document. That is, in FIG. 34 three separate curves, curve Tec1 1031, curve Tec2 1030 and curve Tec3 1029 are plotted.

In order to simplify calculations and comparisons in for FIG. 34, we (somewhat arbitrarily) define a heat cell to be 10 square meters. That is, each core (where the variable capacitors are) harvests the solar energy collected by one 10 square meters cell of asphalt. Note that the cell can be of various geometrical shapes (e.g. square, hexagonal, rectangular, etc.).

Three Energy Thresholds are needed for practical energy yields. The energy "gain" is from the sun's radiant energy. So, there must be at least Esun kilowatt hours of solar radiation falling on the asphalt or concrete cell. In order to utilize a 24-hour night-to-day cycle, the asphalt or concrete cell must be able to thermally store at least Easp kilowatt-hours of heat energy. Finally, the capacitors in the core, that services the asphalt or concrete cell, must be able to store and convert a reasonable amount of energy Ecap.

Thus, Esun>Easp>Ecap. Any one of the three can limit the total energy gain.

According to the NREL (US National Renewable Energy lab), the sun supplies a mean energy of 6 kilowatt hours per day per square meter in the sunbelt states of the USA. This gives 60 kilowatt hours/day per cell. This is an enormous amount of energy and plenty for meeting the "first threshold" Esun mentioned above.

The energy stored as heat in the asphalt depends upon the following:

asphalt specific heat capacity=$2.5556 \times 10^{-4}$ kilowatt hours/(kilogram degree K)

asphalt density≈2200 kilograms/m$^3$ volume of asphalt in cell=sqrt(10)m×sqrt(10)m× 10cm=1m$^3$ High temperature≈60° C.(≈140° F.)→187 kilowatt hours Low temperature≈26.7° C.(≈80° F.)→169 kilowatt hours The result is 19 kilowatt hours per cell, which is a substantial amount of energy and it is easily supplied by Esun.

The energy that can be stored in a capacitor is given by $E_{cap} = \frac{1}{2}CV^2$ where C is in Farads and V is in Volts. Here, we need to use V and C appropriate to each technology (tec1, tec2 and tec3):

tec1: Ten liters stores 0.02 kWh. Assuming V≡200 volts, then C≈3.6 Farads.

tec2: Ten liters stores 0.83 kWh. Assuming V≡1000 volts then C≈6 Farads.

tec3: Ten liters stores 20 kWh. Assuming V≡3500 volts then C≈12 Farads.

Assuming the 175% energy yield holds for scaled-up systems, we have the following.

Tec1's energy output per cell per day a 0.015 kWh, where one cell is 10 square meters of asphalt.

Tec2's energy output per cell per day a 0.62 kWh, where one cell is 10 square meters of asphalt.

Tec3's energy output per cell per day a 15 kWh, where one cell is 10 square meters of asphalt.

Thus, both tec2 and tec3 provide ample energy yields for highly effective solar energy conversion (and storage). For an intuitive reference, the average household in the USA uses just under 30 kilowatt hours per day 1032.

FIG. 35 is an exploded perspective view of a rotary energy modulator for use with solar concentrators, such as the sun-tracking mirror systems built by Stirling Energy Systems, Incorporated. In FIG. 35, about half the volume is occupied by 1051 group-A of pre-charge enabled energy converting variable capacitors. The other half is occupied by 1052 group-B of pre-charge enabled energy converting variable capacitors. Alternately, one group 1052 is made hot, while the other group 1051 is made cool, and visa versa. This is accomplished by a stepper motor 1053, or the like, that drives mechanically-coupled energy deflectors and insulators. Motor 1053 drives shaft 1054 at about one abrupt 180° revolution per half minute. Attached to the shaft 1054 are half-discs 1058, and 1060. A highly concentrated beam of sunlight strikes the circular area 1057, wherein front surface deflector 1056 reflects substantially all the light to the current hot group of capacitors and simultaneously thermally insulates, by back surface 1058, the cold group from conducted heat. Likewise, heat reflecting surface 1060 keeps hot capacitors hot, while back surface 1062 further insulates the hot capacitors from a cooling device such as a fan (not shown) placed near the back of half-disc 1062. Later the motor abruptly rotates the shaft 180°, thereby swapping the heating vs. cooling operation relative to the group-A and group-B. In this manner, an energy conversion cycle with a period of about a minute can be implemented. Automatically timed control of circuit switches shown in FIG. 36 are synchronized with the motor 1053 rotation.

FIG. 36 is a schematic that is coordinated, and vertically aligned, with an information table used to describe the sequence of operations for the subsystem shown in FIG. 35. Electronic switches 1078, 1079, 1080 and 1081 can connect or disconnect their respective circuit elements, based upon the logic levels implied by the words "on" and "off". The steps 0 through 7 are initially executed in order, then steps 1 through 7 continually repeat. Pre-charge enabled energy converting variable capacitor 1083 represents group 1051, while Pre-charge enabled energy converting variable capacitor 1084 represents group 1052.

The "Initial Charge Source" can be from the grid, a battery, photovoltaic unit, etc. or it can be from the previous dynamic capacitor cycle.

Capacitors 1083, 1084 and 1085 may be implemented as a parallel and/or series combination of energy converting variable capacitors.

Delays (not shown) may be needed to allow capacitors to reach desired temperatures.

FIG. 37 shows a cylindrical dynamic capacitor core enclosure 1100 like those in FIG. 1, and FIG. 28, except a plurality of bi-metalic benders 1103 have been added to put a varied stress 1102 on the enclosed variable capacitor 1105. There are two possible applications. First, vary the capacitance with temperature. Second, tune the temperature vs. capacitance curves (e.g. vary the curie temperatures) for more optimum energy yield in different seasons (e.g. summer and winter) of geographical locations. It is known that variation in stress on perovskite materials and the like, can change the relevant properties. So, as the overall temperature ranges change (e.g. summer to winter) the dielectric properties change to maximize total annual energy gain.

FIG. 38 is a perspective view from a side of a road 1128 in which a long cylindrical dynamic capacitor core outer enclosure 1126 (of a dual nested kind) is buried. In order to provide a replaceable inner core enclosure 1127, 1130, 1131 or 1132, at least one end 1128 of the outer tube can be opened (e.g. by a screw-off cap 1133). The opening should project just beyond a concrete curb-like wall 1129, preferably into an access box. Thus, various core enclosure (A, B, or C) can be slid into the more permanent hollow tube 1126. This even allows for hybrid systems using fluid-based heat transfer and/or pre-charge enabled energy converting variable capacitor cores inside 1127.

FIG. 39 is a photograph of a functioning small-scale demonstration of a pre-charge enabled energy converting capacitor 1157 encapsulated in an asphalt road 1153. The demonstration base 1151 is attached to translucent plastic panel 1152, on which are mounted power on-off switch 162, pilot light 1161, circuit board 1164 pre-charge switch 1163, panel meter 1166 and wiring 1165 that connects ceramic capacitor 1157 to pre-charge switch 1163. For scale-reference, sidewalk 1155, curb 1154 and car 1160 are shown. The capacitor is an inexpensive an off-the-shelf ceramic disc capacitor of 0.1 microFarads at room temperature and with a Y5V-like temperature coefficient. As stated previously, much larger (e.g. more than a trillion times larger) capacitance values will be used in energy scaled-up systems. Therefore, the small 0.1 uF capacitor requires a voltmeter of high impedance. The circuit board 1164 and 12-volt battery 1156 enable the panel meter 1166 to act like a $10^{13}$ ohm voltmeter across capacitor 1157. Pre-charging is accomplished by connecting a 3.0 volt regulated voltage source to capacitor 1157 by pressing switch 1163. In operation, the cold asphalt 1153 cools capacitor 1157 (not visible because it is inside the asphalt) and then the operator momentarily pre-charges capacitor 1157 to 3.0 volts by momentarily pressing switch 1163. Then the meter would read 3.0 volts (at 1163), until the 75 watt desk lamp 1158 is switched on, thereby heating the asphalt to about 140° F. at which time the meter reads over 9.0 volts, which is more than triple the 3.0 volts originally applied.

Thus, an innovative dynamic capacitor energy system has been disclosed in extensive detail.

It should be understood that innovations disclosed herein can be more generally applied than explicitly stated. For example, asphalt, concrete and other materials can play the same role as asphalt does in this text. Thus, energy systems built into walls, bridges, fences, etc. are covered too. Also, there are numerous ways of wiring dynamic capacitor cores, all of which are approximately equivalent. They are all covered too.

To the extent that such variations do not depart from the spirit of the invention, they are intended to be included within the scope thereof which is assessed only by a fair interpretation of the following claims.

What is claimed is:

1. An energy system for generating and storing electricity comprising:
  a. polar molecules within a medium that allows energetically efficient movement of said polar molecules,
  b. wherein said polar molecules are substantially surrounded by at least one positive electrode and at least one negative electrode;
  c. collectively described as an energy converting variable capacitor;
  d. wherein one or more said energy converting variable capacitor is enclosed and protected within at least one core enclosure,
  e. which is substantially encapsulated within an encapsulant of blacktop, asphalt, asphalt concrete, bitumen, or concrete,
  f. and wherein said encapsulant absorbs radiant solar energy when said radiant solar energy is substantially available,
  g. and said encapsulant emits radiant energy when said radiant solar energy is substantially absent,
  h. and said encapsulant conducts heat to raise or lower temperatures of said one or more said energy converting variable capacitor;
  i. wherein said temperatures is a capacitance-controlling parameter;
  j. wherein peripheral electronics controls a plurality of phases within at least one energy conversion cycle, k. wherein said phases include pre-charging of said one or more said energy converting variable capacitor by a low-loss inductance-based circuit;

l. wherein a plurality of capacitors called a temporary energy store can temporarily store a resulting gain in electrical energy, m. and said peripheral electronics output a portion of said gain in electrical energy.

2. The energy system of claim 1, wherein said encapsulant is also a road for vehicles, and said core enclosure includes an effective means for protecting said one or more said energy converting variable capacitor from damage due to weight of said vehicles on said road, and said core enclosure has a substantially low profile in its vertical dimension, and said core enclosure has a substantially larger dimension in at least one horizontal dimension, and said improved energy system includes a means of substantially thermally insulating said one or more said energy converting variable capacitor from deeper layers of said road.

3. The energy system of claim 1, wherein said encapsulant is also a parking lot for vehicles, and said core enclosure includes an effective means for protecting said one or more said energy converting variable capacitor from damage due to weight of said vehicles on said parking lot, and said core enclosure has a substantially low profile in its vertical dimension, and said core enclosure has a substantially larger dimension in at least one horizontal dimension, and said improved energy system includes a means of substantially thermally insulating said one or more said energy converting variable capacitor from deeper layers of said parking lot.

4. The energy system of claim 1, wherein said encapsulant is also a wall of a building, wherein said wall includes a means of substantially thermally insulating said one or more said energy converting variable capacitor from deeper layers of said wall, and said core enclosure has a substantially low profile in its horizontal dimension into said wall, and said core enclosure has a substantially larger dimension in at least one dimension that is orthogonal to said horizontal dimension into said wall.

5. The energy system of claim 1, wherein said encapsulant is also a rooftop of a building, wherein said rooftop includes a means of substantially thermally insulating said one or more said energy converting variable capacitor from deeper layers of said rooftop, and-said core enclosure has a substantially low profile in its dimension down into said rooftop, and-said core enclosure has a substantially larger dimension in at least one dimension that is orthogonal to said dimension down into said rooftop.

6. The energy system of claim 1, wherein a plurality of capacitance-controlling curves are selectively activated in order to optimize energy yield fraction for current temperatures of said one or more said energy converting variable capacitor, despite seasonal or diurnal variations in temperature ranges.

7. The energy system of claim 1, wherein said core enclosure is shaped to be substantially easy-to-remove from within a substantially permanent harder-to-remove outer enclosure which is substantially encapsulated in said encapsulant, wherein a substantially high thermal conductivity is provided between said core enclosure and said outer enclosure.

8. The energy system of claim 1, wherein said one or more said energy converting variable capacitor can be produced with a topology comprising coaxial electrode pairs wherein, their ratio of their outer diameter of said coaxial electrode pairs to their length is substantially as extreme as a ratio of diameter to length of long thin muscle elements.

9. The energy system of claim 1, wherein said one or more said energy converting variable capacitor, comprises a substantially optimized dielectric material comprising, a pair of two adjacent linear chains of atoms, wherein, a first type of atom and a second type of atom are included, wherein a linear chain of said first type of atom and a linear chain of said second type of atom have substantially different thermal linear expansion coefficients, and at one end of a first said pair of two adjacent linear chains of atoms is a substantially positive net charge, and at one end of a second said pair of two adjacent linear chains of atoms is a substantially negative net charge, wherein, a first temperature maximizes net polarization of said pair of two adjacent linear chains of atoms, and wherein, a second temperature minimizes net polarization of said pair of two adjacent linear chains of atoms.

10. The energy system of claim 9, wherein a plurality of said pair of two adjacent linear chains of atoms are contained in a medium that allows energy efficient changes in shape of said plurality of said pair of two adjacent linear chains of atoms in response to changes between said first temperature and said second temperature.

11. The energy system of claim 1, wherein said polar molecules comprise a plurality of substantially microscopic particles of a perovskite material, wherein said particles change their degree of polarization in response to changes between a first temperature and a second temperature.

12. The energy system of claim 1, wherein at least one energy modulator provides a repetition of said energy conversion cycle more frequent than once per day, wherein said energy modulator is a means of providing shade alternated with non-shade from said radiant solar energy.

13. A method for building an energy system for generating and storing electricity comprising:

a. providing polar molecules within a medium that allows energetically efficient movement of said polar molecules, b. wherein said polar molecules are substantially surrounded by at least one positive electrode and at least one negative electrode;

c. collectively described as an energy converting variable capacitor;

d. and providing one or more said energy converting variable capacitor enclosed and protected within at least one core enclosure, e. which is substantially encapsulated within an encapsulant of blacktop, asphalt, asphalt concrete, bitumen, or concrete, f. and wherein said encapsulant absorbs radiant solar energy when said radiant solar energy is substantially available, g. and said encapsulant emits radiant energy when said radiant solar energy is substantially absent, h. and said encapsulant conducts heat to raise or lower temperatures of said one or more said energy converting variable capacitor;

i. wherein said temperatures provides a capacitance-controlling parameter;

j. wherein peripheral electronics is provided to control a plurality of phases within at least one energy conversion cycle, k. wherein said phases include pre-charging of said one or more said energy converting variable capacitor by a low-loss inductance-based circuit;

l. wherein a plurality of capacitors called a temporary energy store are provided to temporarily store resulting gain in electrical energy, m. and said peripheral electronics is provided to output a portion of said gain in electrical energy for useful consumption.

* * * * *